US009056626B2

United States Patent
Imamura et al.

(10) Patent No.: US 9,056,626 B2
(45) Date of Patent: Jun. 16, 2015

(54) ELECTRIC POWER STEERING APPARATUS

(71) Applicants: Yousuke Imamura, Shinagawa-ku (JP); Takayoshi Sugawara, Shinagawa-ku (JP); Masahiro Maeda, Shinagawa-ku (JP)

(72) Inventors: Yousuke Imamura, Shinagawa-ku (JP); Takayoshi Sugawara, Shinagawa-ku (JP); Masahiro Maeda, Shinagawa-ku (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 14/387,634

(22) PCT Filed: Apr. 24, 2013

(86) PCT No.: PCT/JP2013/061989
§ 371 (c)(1),
(2) Date: Sep. 24, 2014

(87) PCT Pub. No.: WO2013/168564
PCT Pub. Date: Nov. 14, 2013

(65) Prior Publication Data
US 2015/0088381 A1    Mar. 26, 2015

(30) Foreign Application Priority Data
May 11, 2012  (JP) .................................. 2012-109110

(51) Int. Cl.
*B62D 6/00*   (2006.01)
*B62D 5/04*   (2006.01)
*B62D 7/15*   (2006.01)

(52) U.S. Cl.
CPC .............. *B62D 5/0472* (2013.01); *B62D 6/008* (2013.01); *B62D 7/159* (2013.01); *B62D 5/0463* (2013.01)

(58) Field of Classification Search
USPC ..................... 701/30.4, 41, 42; 180/443, 446, 180/412–413, 421–423; 74/388 PS
See application file for complete search history.

(56) References Cited

U.S. PATENT DOCUMENTS

| 4,703,821 | A | * | 11/1987 | Shimizu | ........................ | 180/446 |
| 4,940,107 | A | * | 7/1990 | Hanisko | ........................ | 180/446 |

(Continued)

FOREIGN PATENT DOCUMENTS

| JP | 60-161257 A | 8/1985 |
| JP | 11-304635 A | 11/1999 |

(Continued)

OTHER PUBLICATIONS

A New Control Framework of Electric Power Steering System Based on Admittance Control; Yang, T; Control Systems Technology, IEEE Transactions on; vol. 23 , Issue: 2; DOI: 10.1109/TCST.2014. 2325892; Publication Year: 2015 , pp. 762-769.*

(Continued)

*Primary Examiner* — Cuong H Nguyen
(74) *Attorney, Agent, or Firm* — Sughrue Mion, PLLC

(57) ABSTRACT

An electric power steering apparatus that is capable of efficiently suppressing vibrations and simultaneously minimizing steering performance degradation such as an increase in a steering wheel's viscous feeling by extracting a vibration component having an arbitrary amplitude and an arbitrary frequency range depending on an electric power steering state parameter and feeding back a vibration suppression compensation value determined depending on the extracted vibration component to a current command value. The apparatus includes a current command value determining section that determines a current command value based on a steering torque and a velocity; a vibration extraction filter that extracts a vibration component having a predetermined amplitude and a predetermined frequency range depending on an electric power steering state parameter; and a compensation value determining section that determines a vibration suppression compensation value based on the vibration component extracted by the vibration extraction filter.

17 Claims, 15 Drawing Sheets

(56) References Cited

U.S. PATENT DOCUMENTS

| | | | | |
|---|---|---|---|---|
| 5,732,373 | A * | 3/1998 | Endo | 701/42 |
| 5,765,661 | A * | 6/1998 | Matsuoka | 180/446 |
| 7,826,950 | B2 * | 11/2010 | Tamaizumi et al. | 701/42 |
| 8,554,417 | B2 * | 10/2013 | Yu | 701/42 |
| 8,589,030 | B2 * | 11/2013 | Lindenstruth | 701/42 |
| 2004/0148080 | A1 * | 7/2004 | Ekmark et al. | 701/41 |
| 2008/0033613 | A1 * | 2/2008 | Tamaizumi et al. | 701/41 |
| 2008/0262678 | A1 | 10/2008 | Nishimura et al. | |
| 2010/0211263 | A1 * | 8/2010 | Lindenstruth | 701/41 |
| 2010/0235047 | A1 | 9/2010 | Kurishige et al. | |
| 2012/0004807 | A1 * | 1/2012 | Hales et al. | 701/41 |
| 2012/0061169 | A1 * | 3/2012 | Oblizajek et al. | 180/446 |

FOREIGN PATENT DOCUMENTS

| | | |
|---|---|---|
| JP | 2006-188183 A | 7/2006 |
| JP | 2009-090953 A | 4/2009 |
| JP | 2011-088491 A | 5/2011 |
| JP | 2011-121383 A | 6/2011 |
| WO | 2007/119333 A1 | 10/2007 |
| WO | 2009/078074 A1 | 6/2009 |

OTHER PUBLICATIONS

An Electric Power Steering System Controller based on Disturbance Observer; Lianbing Li ; Lin He ; Jiang Du ; Tao Lin; Integration Technology, 2007. ICIT '07. IEEE International Conference on; DOI: 10.1109/ICITECHNOLOGY.2007.4290516; Publication Year: 2007 , pp. 446-449.*

International Search Report for PCT/JP2013/061989 dated Jul. 23, 2013.

* cited by examiner

PRIOR ART

PRIOR ART (A) IN THE CASE OF PATENT DOCUMENT 4

(B) IN THE CASE OF THE PRESENT INVENTION (A)

(B)

(A) IN THE CASE OF ABSENCE OF VIBRATION COMPENSATION FUNCTION ACCORDING TO THE PRESENT INVENTION (B) IN THE CASE OF PRESENCE OF VIBRATION COMPENSATION FUNCTION ACCORDING TO THE PRESENT INVENTION

ELECTRIC POWER STEERING APPARATUS

CROSS REFERENCE TO RELATED APPLICATIONS

This application is a National Stage of International Application No. PCT/JP2013/061989 filed Apr. 24, 2013, claiming priority based on Japanese Patent Application No. 2012-109110, filed May 11, 2012, the contents of all of which are incorporated herein by reference in their entirety.

TECHNICAL FIELD

The present invention relates to an electric power steering apparatus that provides a steering system of a vehicle with an assist force generated by a motor, and in particular to an electric power steering apparatus that is capable of efficiently suppressing a torque ripple and simultaneously minimizing steering performance degradation such as an increase in a steering wheel's viscous feeling by extracting a torque ripple vibration component having a predetermined amplitude range and a predetermined frequency range depending on an electric power steering state parameter and feeding back a vibration suppression compensation value determined based on the extracted vibration component or a vibration suppression compensation value determined based on the extracted vibration component and electric power steering state parameter sensitive gains for changing a proportion of vibration suppression compensation to a control system.

BACKGROUND ART

An electric power steering apparatus which provides a steering mechanism of a vehicle with a steering assist torque (an assist torque) by means of a rotational torque of a motor, applies a driving force of the motor as the assist torque to a steering shaft or a rack shaft by means of a transmission mechanism such as gears or a belt through a reduction mechanism. In order to accurately generate the assist torque, such a conventional electric power steering apparatus performs a feedback control of a motor current. The feedback control adjusts a voltage supplied to the motor so that a difference between a steering assist command value (a current command value) and a detected motor current value becomes small, and the adjustment of the voltage applied to the motor is generally performed by an adjustment of a duty ratio of a PWM (Pulse Width Modulation) control.

A general configuration of a conventional electric power steering apparatus will be described with reference to FIG. 1. As shown in FIG. 1, a column shaft (a steering shaft) 2 connected to a steering wheel (a handle) 1, is connected to steered wheels 8L and 8R through reduction gears 3, universal joints 4a and 4b, a rack and pinion mechanism 5, and tie rods 6a and 6b, further via hub units 7a and 7b. Further, the column shaft 2 is provided with a torque sensor 10 for detecting a steering torque of the steering wheel 1, and a motor 20 for assisting the steering force of the steering wheel 1 is connected to the column shaft 2 through the reduction gears 3. Electric power is supplied to a control unit 30 for controlling the electric power steering apparatus from a battery 13, and an ignition key signal is inputted into the control unit 30 through an ignition key 11. The control unit 30 calculates a steering assist command value of an assist (steering assist) command based on a steering torque Tr detected by the torque sensor 10 and a vehicle velocity Vel detected by a velocity sensor 12, and controls a current supplied to the motor 20 based on a current control value E obtained by performing compensation and so on with respect to the steering assist command value. Moreover, it is also possible to receive the velocity Vel from a CAN (Controller Area Network) and so on.

The control unit 30 mainly comprises a CPU (or an MPU or an MCU), and general functions performed by programs within the CPU are shown in FIG. 2.

Functions and operations of the control unit 30 will be described with reference to FIG. 2. As shown in FIG. 2, the steering torque Tr detected by the torque sensor 10 and the velocity Vel from the velocity sensor 12 are inputted into a steering assist command value calculating section 101, and a steering assist command value Iref0 is calculated by means of an assist map. The calculated steering assist command value Iref0 is inputted into a maximum output limiting section 102 and an output is limited based on an overheat protection condition or the like in the maximum output limiting section 102. A current command value Iref that maximum output is limited, is inputted into a subtracting section 103. Hereinafter, a section comprised of the steering assist command value calculating section 101 and the maximum output limiting section 102 is referred to as a current command value determining section 108.

Moreover, with respect to the calculation of the steering assist command value Iref0 performed in the steering assist command value calculating section 101, it is also possible to calculate the steering assist command value Iref0 by using not only the steering torque Tr and the velocity Vel but also a steering angle.

The subtraction section 103 calculates a deviation $\Delta I(=Iref-Im)$ between the current command value Iref and a motor current Im of the motor 20 that is fed back, the deviation $\Delta I$ is controlled by a current control section 104 such as a PI control (proportional and integral control) or the like, the controlled current control value E is inputted into a PWM (Pulse Width Modulation) control section 105 and the duty ratio is calculated, and in accordance with a PWM signal PS that the duty ratio is calculated, the motor 20 is driven through a motor drive circuit 106. The motor current Im applied to the motor 20 is detected by a motor current detecting circuit 107, and the detected motor current Im is inputted into the subtracting section 103 to feed back.

A bridge circuit that bridge-connects semiconductor switching elements (EFTS) and the motor, is used in the motor drive circuit 106 that controls the motor current by means of the current control value E and drives the motor 20. The motor drive circuit 106 that is configured so as to control the motor current by ON/OFF-controlling the semiconductor switching elements in accordance with the duty ratio of the PWM signal determined based on the current control value E, is used.

Generally, since the electric power steering apparatus is a so-called human-machine interface mechanism that directly and easily transmits the feel to a driver among automobile parts, the torque ripple caused by the motor and mechanical mechanism is took up as a problem of steering feeling performance.

In particular, since floor vibration that is caused by the torque ripple caused by the motor and mechanical mechanism and occurs due to vehicle eigenvalue excitation also relates to the problem of a vehicle system's operating noise, it becomes a major problem.

However, since factors of the torque ripple range widely, if taking measures against torque ripple according to factor, there is a problem that it is not efficient.

As solutions for solving such a problem, for example, there are Japanese Published Unexamined Patent Application No. S60-161257 A (Patent Document 1), Japanese Published Unexamined Patent Application No. 2006-188183 A (Patent Document 2), Japanese Published Unexamined Patent Application No. 2009-090953 A (Patent Document 3) and PCT Publication No. WO2009/078074 (Patent Document 4).

A vibration extraction method of "vehicle motion control apparatus" disclosed in Patent Document 1 is a configuration that extracts a vibration component having a specific (an arbitrary) frequency range based on a sensor value for detecting vehicle behaviors (a steering angle) by means of Fourier transform and suppresses vibrations by changing control parameters depending on the extracted vibration component having the arbitrary frequency range.

However, since a configuration for realizing Fourier transform is especially complicated, as a result, making heavy use of microcomputer resource, hence it is difficult to say that the vibration extraction method of Patent Document 1 is an efficient method. Further, in changing the control parameters, there is a problem that which parameter should be changed and the confirmation of trade-off matter with other performances tends to become very complicated.

A vibration extraction method of "electric power steering apparatus" disclosed in Patent Document 2 is a configuration that extracts a vibration component having an arbitrary intended frequency range based on a difference between a vibration center value calculated by performing a moving average with respect to a steering torque and a value obtained by extracting a specific vibration frequency by a band-pass filter with respect to the steering torque and suppresses vibrations by changing control parameters depending on the extracted vibration component having the arbitrary frequency range.

However, also in the vibration extraction method of Patent Document 2, in changing the control parameters, there is a problem that which parameter should be changed and the confirmation of trade-off matter with other performances tends to become very complicated.

A vibration extraction method of "electric power steering apparatus" disclosed in Patent Document 3 is a configuration that extracts a specific frequency component (14-16 Hz) corresponding to a steering system's vibration caused by the application of an inverse input stress by performing a band-pass filter process and a RMS (Root Mean Square) calculation with respect to a steering angle (a pinion angle), obtains an effective value of the extracted frequency component, and changes control parameters depending on a value (a power spectrum) after performing a low-pass filter process with respect to the obtained effective value.

However, since the electric power steering apparatus can not specify a steering pattern of a person who steers a steering wheel (a driver), in the case that a steer-inputted steering frequency is synchronized with the above specific frequency range (14-16 Hz), there is a possibility that a steering component (the steering frequency) inputted by the driver with the intention exists in the above specific frequency range. Therefore, according to the vibration extraction method of Patent Document 3, at the time of such a steering pattern, a problem that the compensation works in a direction that blocks that steering pattern occurs.

Further, as with Patent Document 1, also in the vibration extraction method of Patent Document 3, in changing the control parameters, there is a problem that which parameter should be changed and the confirmation of trade-off matter with other performances tends to become very complicated.

A vibration extraction method of "electric power steering apparatus" disclosed in Patent Document 4 is a method of utilizing a matter that amplitudes of the vibration components such as the torque ripple and a road surface disturbance are smaller than the amplitude of the steering component of the person who steers the steering wheel, and concretely is a configuration that extracts a vibration component (small vibration component) having an arbitrary amplitude based on a difference between an output obtained by performing a hysteresis function process having a hysteresis width corresponding to the vibration component having the arbitrary amplitude with respect to a dynamic state parameter of an electric power steering apparatus or an automobile (a motor's rotational speed or a steering torque) and the above dynamic state parameter, and calculates a vibration compensation value (a vibration suppression current) depending on the extracted vibration component to configure a feedback control loop.

THE LIST OF PRIOR ART DOCUMENTS

Patent Documents

Patent Document 1: Japanese Published Unexamined Patent Application No. S60-161257 A
Patent Document 2: Japanese Published Unexamined Patent Application No. 2006-188183 A
Patent Document 3: Japanese Published Unexamined Patent Application No. 2009-090953 A
Patent Document 4: PCT Publication No. WO2009/078074

SUMMARY OF THE INVENTION

Problems to be Solved by the Invention

However, for example, when running at a high speed, since it is necessary to take a micro line, sometimes a driver slightly steers the steering wheel. Since the amplitude at the time of such a steering pattern (hereinafter referred to as "a micro line-taking steering pattern") is very tiny, according to the vibration extraction method of Patent Document 4, since the amplitude at the time of the micro line-taking steering pattern becomes within the hysteresis width, leading to perform a vibration compensation that blocks the intention of the driver, therefore a problem that the steering wheel's viscous feeling increases occurs.

Further, road surface information (such as an asphalt road surface or a gravel road surface) is included in a vehicle reaction force component from tires. Although the amplitude of the road surface information is relatively small, it becomes necessary information for the driver. Although it is often desired that the electric power steering apparatus does not suppress such information and transmits such information to the driver, since the amplitude of the road surface information is also small, according to the vibration extraction method of Patent Document 4, there is a possibility that the amplitude of the road surface information becomes being within the hysteresis width and the road surface information is compensated.

The present invention has been developed in view of the above-described circumstances, and an object of the present invention is to provide an electric power steering apparatus that is capable of efficiently suppressing the torque ripple and simultaneously minimizing the steering performance degradation such as an increase in the steering wheel's viscous feeling by extracting the torque ripple vibration component having an arbitrary amplitude and an arbitrary frequency range depending on the electric power steering state parameter and feeding back the vibration suppression compensation value determined depending on the extracted vibration component or depending on the extracted vibration component and the electric power steering state parameter sensitive gains for changing the proportion of the vibration suppression compensation to the current command value.

Means for Solving the Problems

The present invention relates to an electric power steering apparatus that provides a steering system of a vehicle with an assist force generated by a motor, the above-described object of the present invention is achieved by that comprising: a current command value determining section that determines a current command value based on a steering torque and a velocity; a vibration extraction filter that extracts a vibration component having a predetermined amplitude and a predetermined frequency range depending on an electric power steering state parameter; and a compensation value determining section that determines a vibration suppression compensation value based on said vibration component extracted by said vibration extraction filter, wherein vibrations of said motor are suppressed by feeding back said vibration suppression compensation value determined by said compensation value determining section to said current command value determined by said current command value determining section.

The above-described object of the present invention is more effectively achieved by that wherein said vibration extraction filter comprises an extraction inverse characteristic filter with window that calculates a vibration center value based on said electric power steering state parameter and depending on an inverse characteristic of said predetermined frequency range, and extracts said vibration component having said predetermined amplitude and said predetermined frequency range based on a difference between said vibration center value and said electric power steering state parameter; or wherein said extraction inverse characteristic filter with window comprises an inverse characteristic filter that has said inverse characteristic of said predetermined frequency range and an amplitude window judging section that said predetermined amplitude is preset, wherein said extraction inverse characteristic filter with window inputs said electric power steering state parameter to said inverse characteristic filter and then outputs an output of said inverse characteristic filter to said amplitude window judging section, wherein said amplitude window judging section performs an amplitude window judging process that judges whether said electric power steering state parameter is within an amplitude window being said previous value of said vibration center value±said predetermined amplitude or not based on said electric power steering state parameter, said output of said inverse characteristic filter and a previous value of said vibration center value, in a case of judging that said electric power steering state parameter is within said amplitude window, outputs said output of said inverse characteristic filter as said vibration center value, in a case of judging that said electric power steering state parameter is outside said amplitude window, outputs a value obtained by adding said predetermined amplitude to said electric power steering state parameter or subtracting said predetermined amplitude from said electric power steering state parameter as said vibration center value.

Further, the above-described object of the present invention is more effectively achieved by that wherein said extraction inverse characteristic filter with window comprises an inverse characteristic filter that has said inverse characteristic of said predetermined frequency range and an amplitude window judging section that comprises a means of increasing or decreasing said predetermined amplitude that is preset depending on an electric power steering state parameter relating to motor current amount, wherein said extraction inverse characteristic filter with window inputs said electric power steering state parameter to said inverse characteristic filter and then outputs an output of said inverse characteristic filter to said amplitude window judging section, wherein said amplitude window judging section performs an amplitude window judging process that judges whether said electric power steering state parameter is within an amplitude window being said previous value of said vibration center value±said predetermined amplitude or not based on said electric power steering state parameter, said output of said inverse characteristic filter and a previous value of said vibration center value after setting said predetermined amplitude by increasing or decreasing said predetermined amplitude depending on said electric power steering state parameter relating to motor current amount, in a case of judging that said electric power steering state parameter is within said amplitude window, outputs said output of said inverse characteristic filter as said vibration center value, in a case of judging that said electric power steering state parameter is outside said amplitude window, outputs a value obtained by adding said predetermined amplitude to said electric power steering state parameter or subtracting said predetermined amplitude from said electric power steering state parameter as said vibration center value; or wherein said electric power steering state parameter relating to motor current amount is said current command value or said steering torque; or wherein said electric power steering state parameter relating to motor current amount is said current command value, wherein said amplitude window judging section sets said predetermined amplitude so as to increase depending on an increase in said current command value; or wherein said compensation value determining section calculates sensitive gains for changing a proportion of said vibration suppression compensation value depending on an electric power steering state parameter relating to motor current amount and an electric power steering state parameter relating to speed, and sets a value obtained by multiplying said vibration suppression compensation value determined based on said vibration component extracted by said vibration extraction filter by calculated said sensitive gains as said vibration suppression compensation value; or wherein said compensation value determining section decreases said proportion of said vibration suppression compensation value by decreasing said sensitive gain concerning said electric power steering state parameter relating to motor current amount in a case that said electric power steering state parameter relating to motor current amount is less than or equal to a predetermined threshold, and decreases said proportion of said vibration suppression compensation value by decreasing said sensitive gain concerning said electric power steering state parameter relating to speed in a case that said electric power steering state parameter relating to speed is more than or equal to a predetermined threshold; or wherein said electric power steering state parameter relating to motor current amount is said current command value or said steering torque, wherein said electric power steering state parameter relating to speed is a steering speed or a motor angular speed.

Furthermore, the above-described object of the present invention is more effectively achieved by that wherein said extraction inverse characteristic filter with window comprises an inverse characteristic filter that has said inverse characteristic of said predetermined frequency range and an amplitude window judging section that comprises a means of increasing or decreasing said predetermined amplitude that is preset depending on said velocity, wherein said extraction inverse characteristic filter with window inputs said electric power steering state parameter to said inverse characteristic filter and then outputs an output of said inverse characteristic filter to said amplitude window judging section, wherein said amplitude window judging section performs an amplitude window judging process that judges whether said electric power steering state parameter is within an amplitude window being said previous value of said vibration center value±said predetermined amplitude or not based on said electric power steering state parameter, said output of said inverse characteristic filter and a previous value of said vibration center value after setting said predetermined amplitude by increasing or decreasing said predetermined amplitude depending on said velocity, in a case of judging that said electric power steering state parameter is within said amplitude window, outputs said output of said inverse characteristic filter as said vibration center value, in a case of judging that said electric power steering state parameter is outside said amplitude window, outputs a value obtained by adding said predetermined amplitude to said electric power steering state parameter or subtracting said predetermined amplitude from said electric power steering state parameter as said vibration center value; or wherein said compensation value determining section calculates a velocity sensitive gain for changing a proportion of said vibration suppression compensation value depending on said velocity, and sets a value obtained by multiplying said vibration suppression compensation value determined based on said vibration component extracted by said vibration extraction filter by calculated said velocity sensitive gain as said vibration suppression compensation value; or wherein in a case that said velocity is more than or equal to a predetermined velocity, said amplitude window judging section sets said predetermined amplitude by decreasing said predetermined amplitude depending on said velocity, and said compensation value determining section decreases said proportion of said vibration suppression compensation value by decreasing said velocity sensitive gain.

Moreover, the above-described object of the present invention is more effectively achieved by that wherein said predetermined frequency range is a frequency range except vibration components of a frequency range that said electric power steering apparatus aims to transmit to a person who steers a steering wheel; or wherein said predetermined frequency range is a frequency range except a frequency range that said electric power steering apparatus aims to transmit to a person who steers a steering wheel and a frequency range being more than or equal to a frequency limited by sampling and so on that vibration extraction accuracy becomes worse; or wherein said frequency range that said electric power steering apparatus aims to transmit to said person who steers said steering wheel is a frequency range being less than or equal to about 10 [Hz] that road surface information, tire conditions and so on are included in; or wherein said electric power steering state parameter is an electric power steering state parameter relating to motor current amount or an electric power steering state parameter relating to speed; or wherein said electric power steering state parameter relating to motor current amount is said steering torque, said current command value or a detected motor current; or wherein said electric power steering state parameter relating to speed is a steering speed or a motor angular speed; or wherein said electric power steering state parameter is a result of multiplying said steering torque by a steering speed as steering energy, a result of multiplying said current command value by a torque constant and a motor angular speed as motor kinetic energy or a result of multiplying a detected motor current by a power-supply voltage as motor electric energy.

Effects of the Invention

According to the electric power steering apparatus of the present invention, since it is possible to extract the torque ripple vibration component having the arbitrary amplitude and the arbitrary frequency range depending on the electric power steering state parameter by means of the vibration extraction filter, it is possible to efficiently extract the vibration component like the torque ripple that the amplitude is smaller than the steering component, and also since vibration extraction becomes possible while performing separation of vibration components such as the road surface information and so on that should be fed back to the driver and vibration components such as the torque ripple, a judder vibration and so on that should be suppressed, it is possible to efficiently suppress the torque ripple vibration while minimizing the steering performance degradation.

Further, in the present invention, in determining the vibration suppression compensation value based on the extracted vibration component, since varying the proportion of the vibration suppression compensation value depending on the electric power steering state parameter relating to motor current amount (for example, the current command value) and the electric power steering state parameter relating to speed (for example, the motor angular speed), i.e. since calculating electric power steering state parameter sensitive gains for changing the proportion of the vibration suppression compensation, it is possible to suppress the viscous feeling at the time of start of the steering operation in the vicinity of on-center that occurs in the state that the signal relating to motor current amount is low, and simultaneously it is also possible to resolve the effect caused by degradation of extraction accuracy of the vibration waveform that occurs in the case that the signal relating to speed indicates a high rotational speed.

Moreover, in the present invention, in determining the vibration suppression compensation value based on the extracted vibration component, since varying the proportion of the vibration suppression compensation value depending on not only the electric power steering state parameter relating to motor current amount and the electric power steering state parameter relating to speed but also the velocity, it is possible to certainly increase the vibration suppression effect with respect to the vibration change of the vibration component that changes depending on the velocity, and simultaneously it is also possible to resolve the viscous feeling caused by the micro steering in the vicinity of on-center that is frequently performed.

MODE FOR CARRYING OUT THE INVENTION

Figure 1:
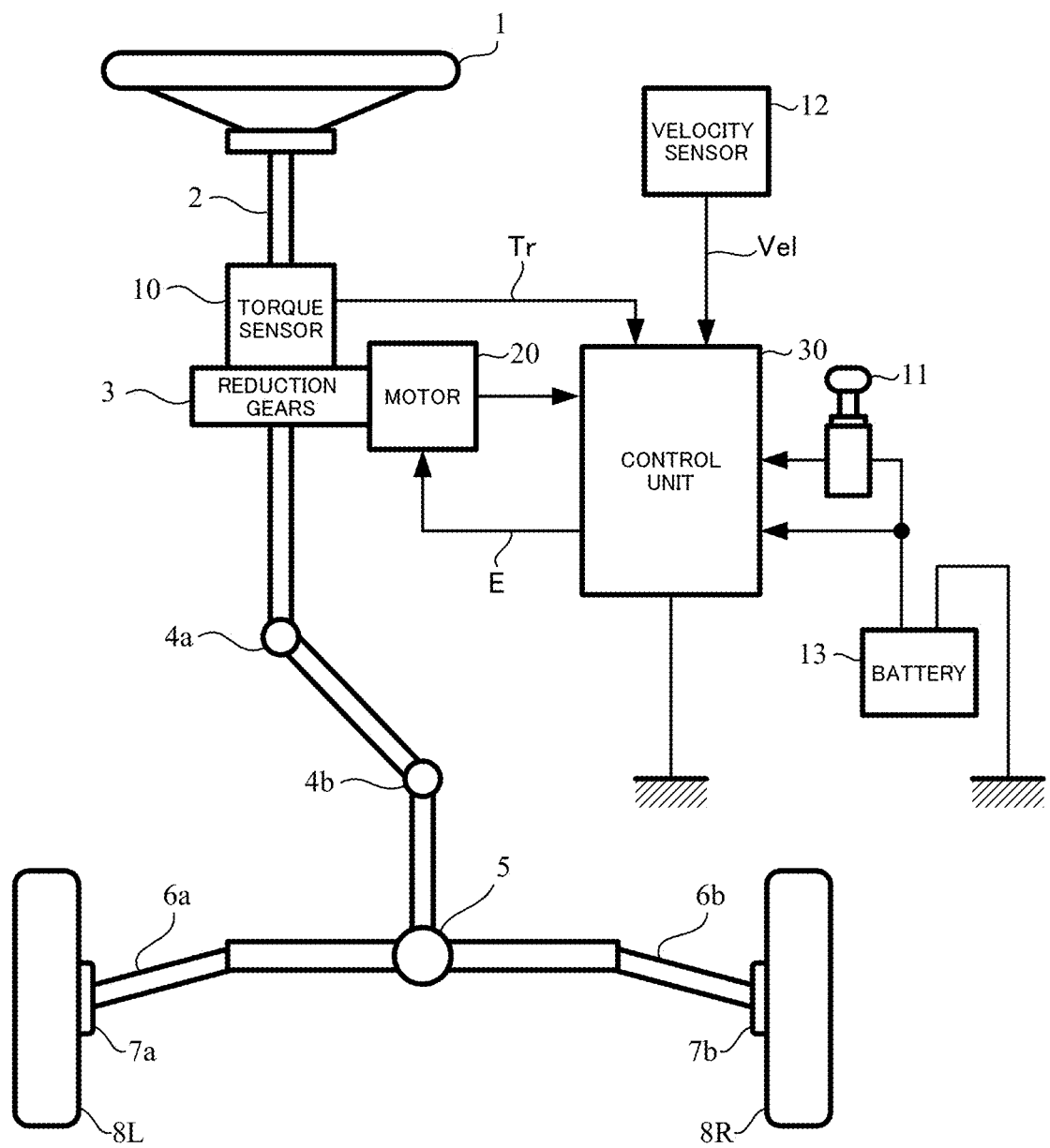
FIG. 1 is a diagram showing a configuration example of a general electric power steering apparatus.

The present invention relates to an electric power steering apparatus that is capable of efficiently controlling torque ripples caused by various factors by utilizing a matter that the torque ripples (torque vibrations) being a main factor of the floor vibrations appear remarkably in a motor angular speed signal being an electric power steering state parameter, extracting a vibration component that is included in the motor angular speed signal (a motor angular speed) by means of a vibration extraction filter (a vibration extraction filter function), determining a vibration suppression compensation value for suppressing the torque ripples based on extracted vibration component (a vibration component signal), and feeding back determined vibration suppression compensation value to a current command value.

Further, in the electric power steering apparatus according to the present invention, in determining the vibration suppression compensation value, it is also possible to determine the vibration suppression compensation value based on not only the extracted vibration component but also the current command value and the motor angular speed signal.

Moreover, in the electric power steering apparatus according to the present invention, in determining the vibration suppression compensation value, it is also possible to determine the vibration suppression compensation value based on not only the extracted vibration component but also the current command value, the motor angular speed signal and a velocity.

Then, in the electric power steering apparatus according to the present invention, the vibration extraction filter is configured so as to work only within a predetermined amplitude, and comprise an extraction inverse characteristic filter with window that has an inverse characteristic filter (for example, weighted average, low-pass, high-pass, band-pass and so on) that outputs a torque ripple vibration component of an inverse characteristic of an arbitrary frequency range with respect to the electric power steering state parameter (the motor angular speed signal) being inputted into the vibration extraction filter, and extract the torque ripple vibration component having an arbitrary amplitude and the arbitrary frequency range by using a difference between an output of the extraction inverse characteristic filter with window (i.e. a vibration center value) and the electric power steering state parameter (the motor angular speed signal) being inputted into the vibration extraction filter.

That is to say, the vibration extraction filter of the present invention comprises the extraction inverse characteristic filter with window that if the electric power steering state parameter is within the predetermined amplitude, calculating the vibration center value depending on an inverse characteristic of a predetermined frequency range that is obtained by inputting the electric power steering state parameter to the inverse characteristic filter, and extracts a vibration component having the predetermined amplitude and the predetermined frequency range based on the difference between the vibration center value calculated by the extraction inverse characteristic filter with window and the electric power steering state parameter.

According to the electric power steering apparatus of the present invention that has the vibration extraction filter, since it is possible to extract the torque ripple vibration component having the arbitrary amplitude and the arbitrary frequency range depending on the electric power steering state parameter, it is possible to efficiently extract the vibration component like the torque ripple that the amplitude is smaller than the steering component, and also since vibration extraction becomes possible while performing separation of vibration components such as the road surface information and so on that should be fed back to the driver and vibration components such as the torque ripple, the judder vibration and so on that should be suppressed, when applying the electric power steering apparatus according to the present invention, it is possible to efficiently suppress the torque ripple vibration while minimizing the steering performance degradation (for example, the increase in the steering wheel's viscous feeling that occurs at the time of the micro line-taking steering pattern).

In other words, the present invention judges whether the electric power steering state parameter being capable of detecting the vibration component is within the predetermined amplitude or not, in the case that the electric power steering state parameter is within the predetermined amplitude, updates the vibration center value by means of a filter that outputs the inverse characteristic of the arbitrary frequency range (i.e. the extraction inverse characteristic filter with window), in the case that the electric power steering state parameter is outside the predetermined amplitude, updates the vibration center value without using the extraction inverse characteristic filter with window, and extracts the vibration component having the arbitrary vibration frequency range and the arbitrary amplitude range by calculating the difference between the updated vibration center value and the initial electric power steering state parameter.

Here, as the electric power steering state parameter used in the present invention, except the above-described motor angular speed signal, if a signal is capable of detecting the vibration component, of course it is possible to use the signal such as a steering torque detected by a torque sensor, a steering speed, a power-supply voltage or a voltage being applied to the motor.

In the present invention, in extracting the torque ripple vibration component having the arbitrary amplitude and the arbitrary frequency range by means of the vibration extraction filter depending on the electric power steering state parameter being capable of detecting the vibration component, not extracting a vibration component of a frequency range that the electric power steering apparatus aims to transmit to the person who steers the steering wheel (i.e. a vibration component being less than or equal to about 10 [Hz] that the road surface information, tire conditions and so on are included in), and extracting a vibration component of a frequency range that the electric power steering apparatus does not aim to transmit to the person who steers the steering wheel (i.e. a vibration component such as the floor vibration caused by system eigenvalue excitation and the motor torque ripple), and further, the arbitrary frequency range is a frequency range of information that the electric power steering apparatus does not aim to transmit to the person who steers the steering wheel.

In this way, since the present invention can extract the torque ripple vibration component having the arbitrary amplitude and the arbitrary frequency range by a simple configuration, it becomes possible to efficiently suppress the vibration component caused by the torque ripple, mechanical resonance and so on without causing a steering uncomfortable feeling while efficiently using microcomputer resource.

Hereinafter, concrete embodiments of the present invention will be described in detail with reference to the accompanying drawings.

First Embodiment

Figure 2:
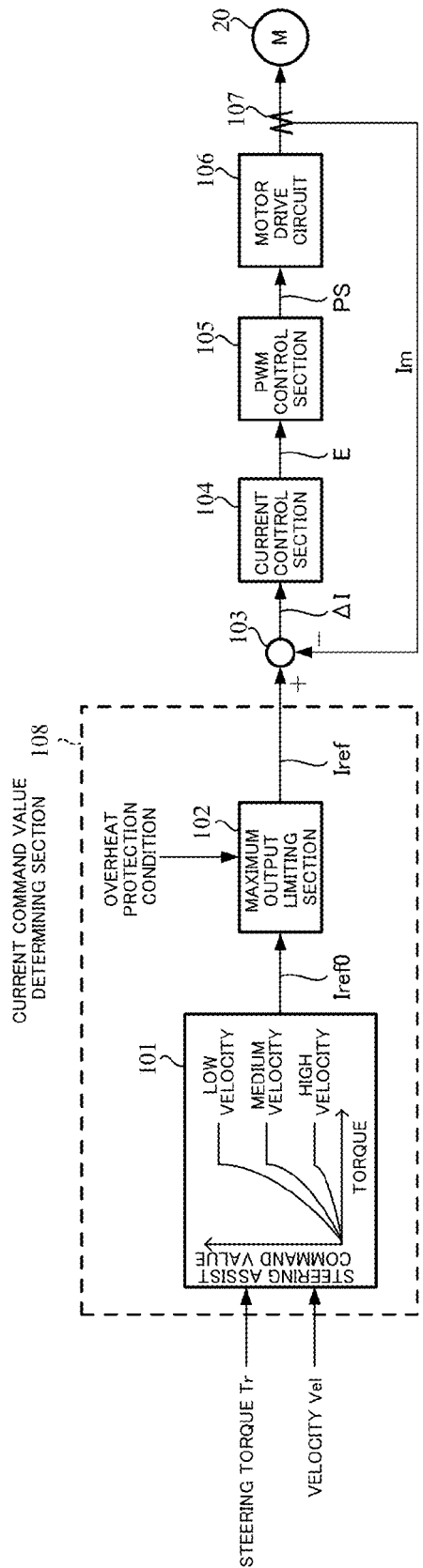
FIG. 2 is a block diagram showing one example of a control unit.
Figure 3:
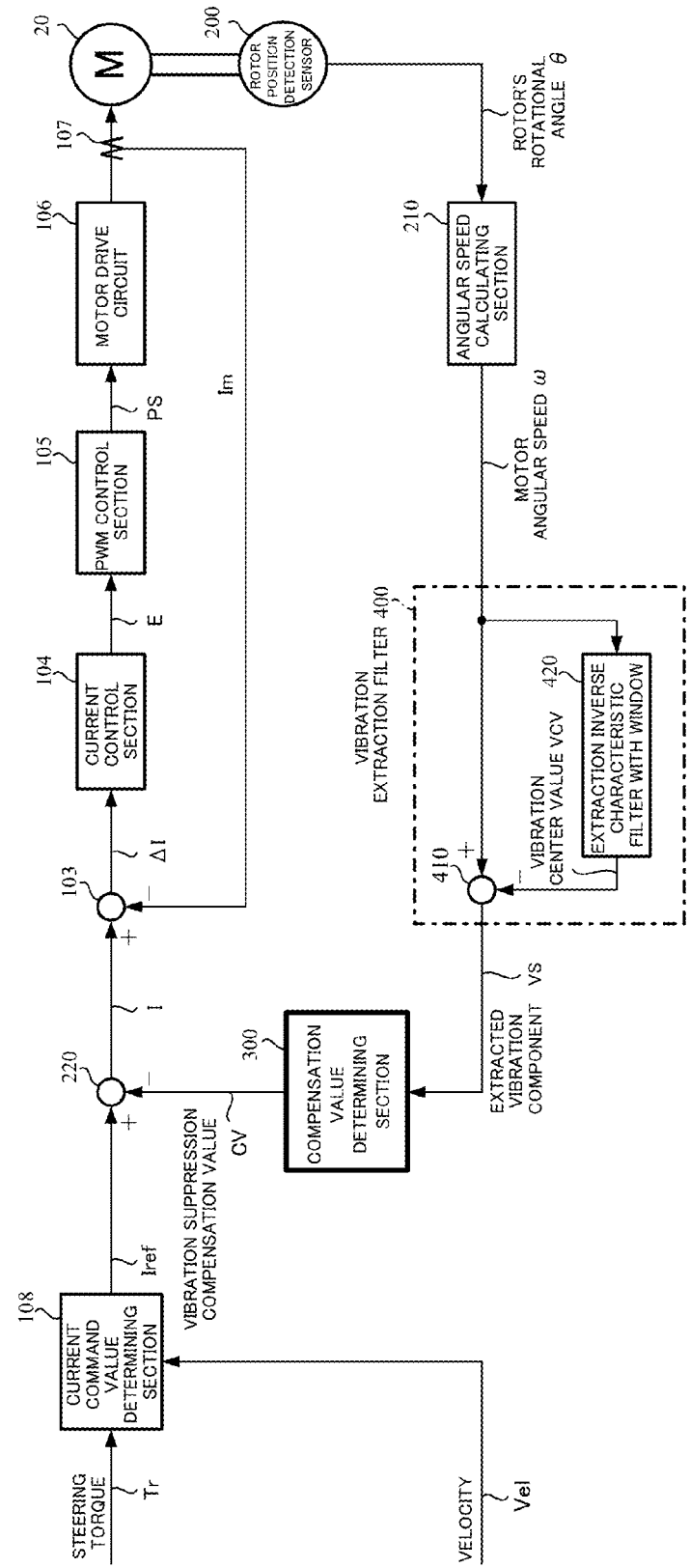
FIG. 3 is a block diagram showing a configuration example of the first embodiment of an electric power steering apparatus according to the present invention.
Figure 4:
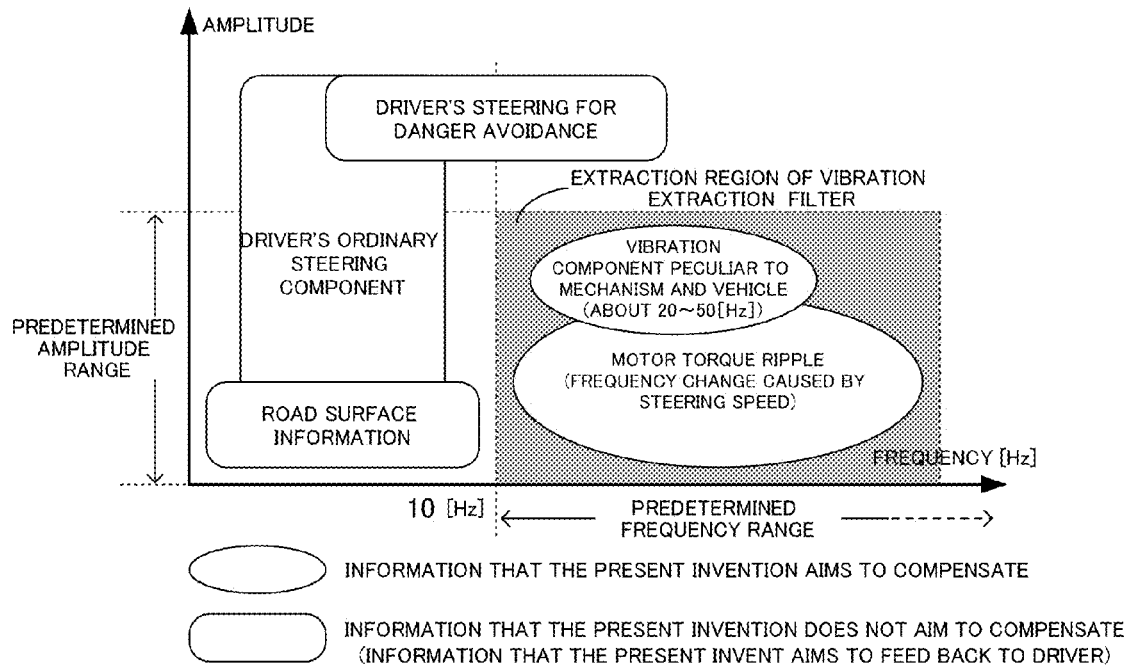
FIG. 4 is a diagram showing frequency distribution examples of vibration components.
Figure 5:
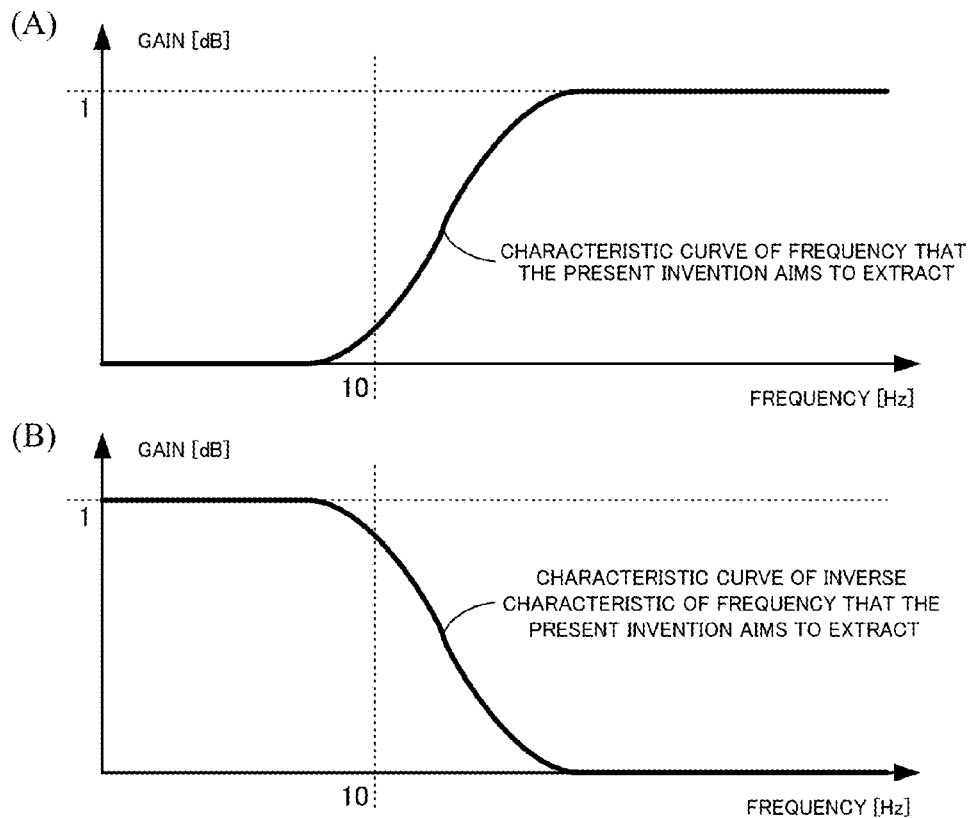
FIGS. 5(A) and 5(B) are diagrams showing characteristic setting examples of an extraction inverse characteristic filter with window (examples in a case that a predetermined frequency range that the present invention aims to exact is a high-pass characteristic) in the first embodiment of the electric power steering apparatus according to the present invention.

FIG. 3 is a block diagram showing a configuration example of the first embodiment of the electric power steering apparatus according to the present invention, the portion of the electric power steering apparatus is shown as corresponding to FIGS. 1 and 2, with respect to identical configurations, identical reference numerals are given without adding explanations. Further, FIG. 4 shows frequency distribution examples of vibration components. Then, FIGS. 5(A) and 5(B) are diagrams showing characteristic setting examples of the extraction inverse characteristic filter with window (examples in a case that the predetermined frequency range that the present invention aims to exact is a high-pass characteristic) in the first embodiment of the electric power steering apparatus according to the present invention. Moreover, in the first embodiment, the motor angular speed (the motor angular speed signal) is used as the electric power steering state parameter.

With reference to FIGS. 3, 4, 5(A) and 5(B), functions and the whole operation of the electric power steering apparatus according to the first embodiment of the present invention will be described in detail.

As shown in FIG. 3, a current command value determining section 108 determines a current command value Iref based on a steering torque Tr detected by a torque sensor 10 and a velocity Vel detected by a velocity sensor 12. The determined current command value Iref is inputted into a subtracting section 220.

Meanwhile, a motor current Im being applied to a motor 20 is detected by a motor current detecting circuit 107, and the detected motor current Im is inputted into a subtracting section 103.

Further, a rotor's rotational angle θ being a rotor position signal is detected by a rotor position detection sensor 200 for detecting a rotor position of the motor 20 (a rotor position detector such as a resolver or a Hall sensor). An angular speed calculating section 210 calculates a motor angular speed ω based on the rotor's rotational angle θ detected by the rotor position detection sensor 200. Then, the calculated motor angular speed ω is inputted into a vibration extraction filter 400 being one substantial part of the present invention.

The vibration extraction filter 400 extracts a vibration component having a predetermined amplitude and a predetermined frequency range based on the inputted motor angular speed ω, and the extracted vibration component VS is inputted into a compensation value determining section 300 being another substantial part of the present invention.

Next, the compensation value determining section 300 determines a vibration suppression compensation value CV based on the extracted vibration component VS, and the determined vibration suppression compensation value CV is inputted into the subtracting section 220.

Then, a vibration-compensated current command value I is calculated by subtracting the vibration suppression compensation value CV from the current command value Iref in the subtracting section 220, that is, by being configured so as to feed back the vibration suppression compensation value CV to the current command value Iref. The calculated vibration-compensated current command value I is inputted into a subtracting section 103.

Then, the subtracting section 103 obtains a deviation ΔI (=I−Im) between the vibration-compensated current command value I and the motor current Im of the motor 20 being fed back, the obtained deviation ΔI is controlled by a current control section 104, a controlled current control value E is inputted into a PWM control section 105 so as to calculate a duty, and the motor 20 is driven by a PWM signal PS that the duty is calculated through a motor drive circuit 106.

Here, the vibration component having "the predetermined amplitude" and "the predetermined frequency range" being extracted by the vibration extraction filter 400 of the present invention (i.e. a vibration component that the present invention intends to compensate) will be described.

The vibration component that the present invention intends to compensate is the torque ripple that mainly occurs in the motor, a resonance vibration produced by a vibration excitation peculiar to a vehicle frame and so on, the vehicle reaction force component from tires and so on. Amplitudes of these vibration components are smaller than the amplitude of the steering component of the person who steers the steering wheel. That is to say, the amplitudes of the vibration components such as the torque ripple and the road surface disturbance are smaller than the amplitude of the steering component of the person who steers the steering wheel.

As described above, also in the vibration extraction method of Patent Document 4, the extraction of these vibration components is performed by extracting a vibration waveform within the predetermined amplitude by use of this matter.

However, for example, when running at a high speed, since it is necessary to take the micro line, sometimes the driver slightly steers the steering wheel in the vicinity of on-center. Since the amplitude at the time of the micro line-taking steering pattern is very tiny, according to the vibration extraction method of Patent Document 4, since extracting the vibration component only based on the amplitude, the micro line-taking steering pattern is also regarded as the vibration component and compensated, as a result, a problem that the steering viscous feeling increases and simultaneously becoming a steering fluffy feeling occurs.

Further, the road surface information (such as an asphalt road surface or a gravel road surface) is included in the vehicle reaction force component from tires. Although the amplitude of the road surface information is relatively small, it becomes necessary information for the driver. Although it is often desired that the electric power steering apparatus does not suppress such information and transmits such information to the driver, since the amplitude of the road surface information is also small, according to the vibration extraction method of Patent Document 4, there is a problem that the amplitude of the road surface information becomes being within the hysteresis width and the road surface information is compensated.

FIG. 4 shows one distribution example of the frequency and the amplitude of vibration components. As shown in FIG. 4, the vibration components that the present invention aims to compensate are vibration components peculiar to the mechanism and the vehicle, and the motor torque ripple that are felt by the driver as an uncomfortable feeling, on the other hand, the vibration components that the present invention does not aim to compensate (i.e. information that the present invention aims to feed back to the driver) are the driver's steering component, the road surface information and so on, these vibration components that the present invention does not aim to compensate are distributed in about 10 [Hz] or less.

The present invention efficiently suppresses the vibration components becoming the uncomfortable feeling to improve the steering performance without effects on the steering feeling caused by the electric power steering apparatus by limiting the vibration component being suppressed to the vibration component having "the predetermined amplitude" and "the predetermined frequency range" by means of the vibration extraction filter. "The predetermined frequency range" said by the present invention means a frequency range of the vibration component that the present invention aims to compensate.

Here, functions and operations of the vibration extraction filter 400 will be described.

As shown in FIG. 3, the vibration extraction filter 400 comprises a subtracting section 410 and an extraction inverse characteristic filter with window 420. Processes (operations) performed by the vibration extraction filter 400 are as follows.

At first, the vibration extraction filter 400 extracts a vibration component having an inverse characteristic of "the predetermined amplitude" and "the predetermined frequency range" based on the motor angular speed ω from the angular speed calculating section 210 by means of the extraction inverse characteristic filter with window 420.

Here, the vibration component having the inverse characteristic of "the predetermined amplitude" and "the predetermined frequency range" is outputted from the extraction inverse characteristic filter with window 420 as a vibration center value VCV.

Next, the vibration extraction filter 400 extracts the vibration component VS having "the predetermined amplitude" and "the predetermined frequency range" by calculating a difference between the extracted vibration component having the inverse characteristic of "the predetermined amplitude" and "the predetermined frequency range" (i.e. the vibration center value VCV) and the motor angular speed ω by means of a subtracting section 410.

Here, the vibration component VS having "the predetermined amplitude" and "the predetermined frequency range" extracted by the vibration extraction filter 400 is inputted into the compensation value determining section 300.

"The inverse characteristic" called by the present invention is such a characteristic that allows passage of frequencies of information that the present invention does not aim to compensate shown in such as FIG. 4 and cuts frequencies that the present invention aims to compensate. In the example of FIG. 4, since not extracting the vibration component being less than or equal to about 10 [Hz], "the inverse characteristic" of the present invention becomes a low-pass characteristic that its cutoff frequency is about 10 [Hz].

FIGS. 5(A) and 5(B) show characteristic setting examples of the extraction inverse characteristic filter with window 420 in the case that "the predetermined frequency range" extracted by the vibration extraction filter 400 is a high-pass characteristic. Concretely, FIG. 5(A) shows a characteristic curve of a frequency range having the high-pass characteristic that is extracted by the vibration extraction filter 400. Further, FIG. 5(B) shows a characteristic curve of an inverse characteristic of the frequency range having the high-pass characteristic shown in FIG. 5(A) (i.e. a characteristic curve of an inverse characteristic that the extraction inverse characteristic filter with window 420 has).

Figure 6:
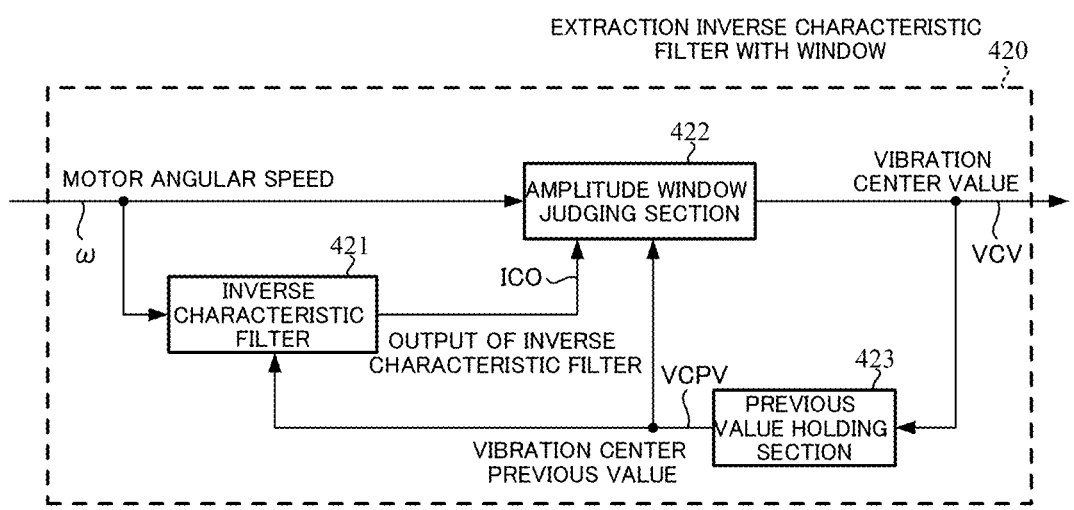
FIG. 6 is a block diagram showing a configuration example of the extraction inverse characteristic filter with window in the first embodiment of the electric power steering apparatus according to the present invention.

FIG. 6 is a block diagram showing a configuration example of the extraction inverse characteristic filter with window 420 in the first embodiment of the electric power steering apparatus according to the present invention. Based on FIG. 6, functions and operations of the extraction inverse characteristic filter with window 420 will be described.

As shown in FIG. 6, the extraction inverse characteristic filter with window 420 comprises an inverse characteristic filter 421 that has the inverse characteristic of "the predetermined frequency range", an amplitude window judging section 422 that "the predetermined amplitude" is preset, and a previous value holding section 423 that holds a vibration center previous value.

With respect to the inputted motor angular speed ω, processes (operations) performed by the extraction inverse characteristic filter with window 420 are as follows.

At first, the extraction inverse characteristic filter with window 420 inputs the motor angular speed ω to the inverse characteristic filter 421 and then outputs an output ICO of the inverse characteristic filter 421 to the amplitude window judging section 422. Here, the inverse characteristic of "the predetermined frequency" that the inverse characteristic filter 421 has, is the inverse characteristic of frequency characteristic that the present invention aims to extract shown in such as FIG. 5(B).

Next, the extraction inverse characteristic filter with window 420 performs an amplitude window judging process that judges whether the motor angular speed ω is within an amplitude window or not based on the motor angular speed ω, the output ICO of the inverse characteristic filter 421 and a vibration center previous value VCPV from the previous value holding section 423 (i.e. a previous value of the vibration center value VCV) by means of the amplitude window judging section 422.

In the case of judging that the motor angular speed ω is within the amplitude window by the amplitude window judging process, the amplitude window judging section 422 outputs the output ICO of the inverse characteristic filter 421 as the vibration center value VCV.

On the other hand, in the case of judging that the motor angular speed ω is outside the amplitude window by the amplitude window judging process, the amplitude window judging section 422 outputs a value obtained by adding "the predetermined amplitude" to the motor angular speed ω or subtracting "the predetermined amplitude" from the motor angular speed ω as the vibration center value VCV.

"The amplitude window" called by the present invention means a range being the vibration center previous value VCPV±"the predetermined amplitude".

Further, the amplitude window judging section 422 outputs the vibration center value VCV from the amplitude window judging section 422 to both the subtracting section 410 and the previous value holding section 423. The previous value holding section 423 holds the inputted vibration center value VCV as the vibration center previous value VCPV.

In this way, in the present invention, by means of the vibration extraction filter 400, it is possible to extract the vibration component having the predetermined amplitude and the predetermined frequency range, and simultaneously it is possible to perform the vibration compensation without degradation of the steering component.

In order to demonstrate excellent vibration extraction effect of the vibration extraction filter 400 according to the present invention, FIG. 7(A) shows a vibration extraction result based on a conventional vibration extraction method and FIG. 7(B) shows a vibration extraction result based on the vibration extraction filter 400 according to the present invention.

Here, the vibration extraction method of Patent Document 4 is used as the conventional vibration extraction method of FIG. 7(A). Further, "the amplitude window" of FIG. 7(B) showing the vibration extraction result based on the vibration extraction filter 400 according to the present invention means the vibration center value±"the predetermined amplitude".

In order to compare the vibration extraction result based on the vibration extraction filter 400 according to the present invention with the vibration extraction result based on the vibration extraction method of Patent Document 4, the hysteresis width of the vibration extraction method of Patent Document 4 and the predetermined amplitude of the vibration extraction filter 400 according to the present invention are set so as to become the same value. Further, in extracting the vibration component, also with respect to the necessary motor angular speed signal, the same signal is used.

Figure 7:
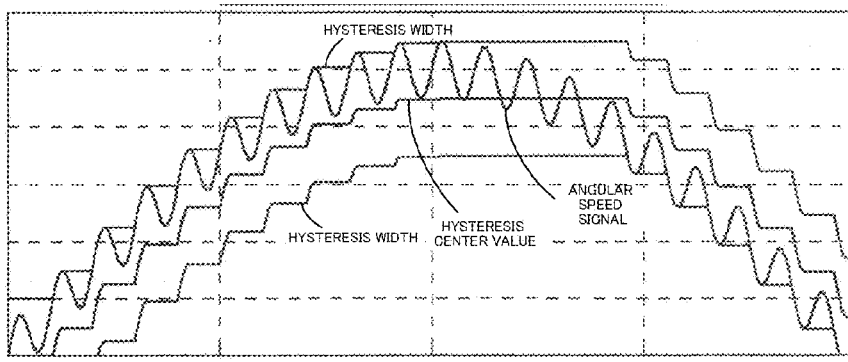
FIG. 7(A) is a diagram showing a vibration extraction result based on a conventional vibration extraction method and FIG. 7(B) is a diagram showing a vibration extraction result based on the present invention.
Figure 7:
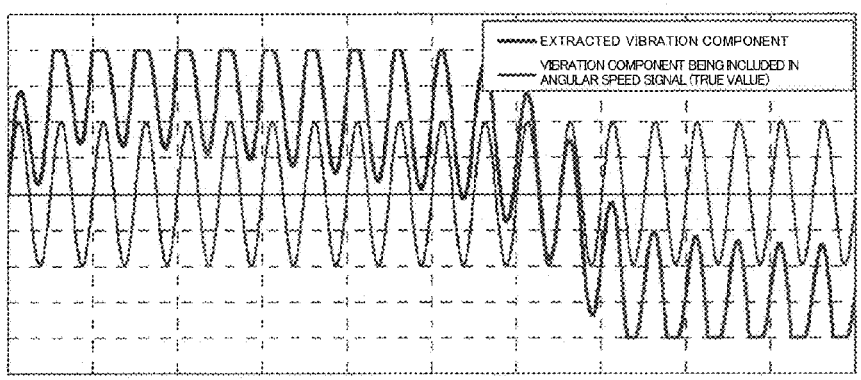
Figure 7:
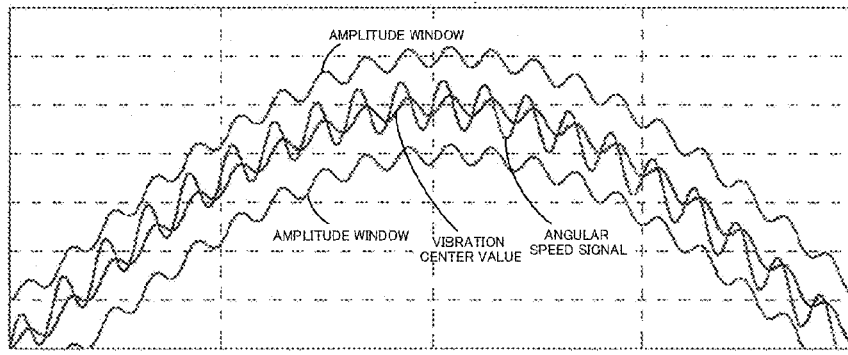
Figure 7:
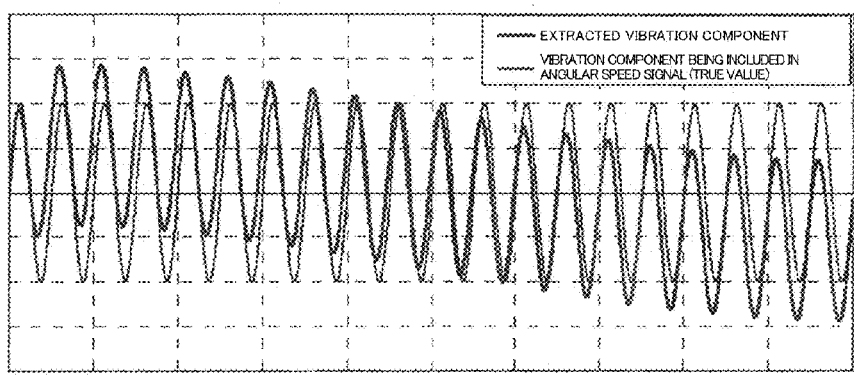

As can be seen from FIG. 7, in the vibration extraction result based on the vibration extraction filter 400 according to the present invention, an overlap between the steering component of the low frequency and the extracted vibration component is suppressed. Therefore, the vibration suppression becomes possible while suppressing the effect on the steering feeling caused by the vibration suppression function.

Moreover, in the present invention, it is preferred to utilize the previous value of the vibration center value as a previous value used in the process performed by the extraction inverse characteristic filter with window. Therefore, there is an advantage that with respect to switching of the output of the amplitude window judging section 422, the output of the inverse characteristic filter 421 is connected smoothly, even frequently switching between within the amplitude window and outside the amplitude window, the uncomfortable feeling does not occur.

Further, in the present invention, when using the weighted average in the inverse characteristic filter 421, there is an advantage that with respect to reflection of the vibration center previous value, it is possible to realize by means of an easy configuration.

Figure 8:
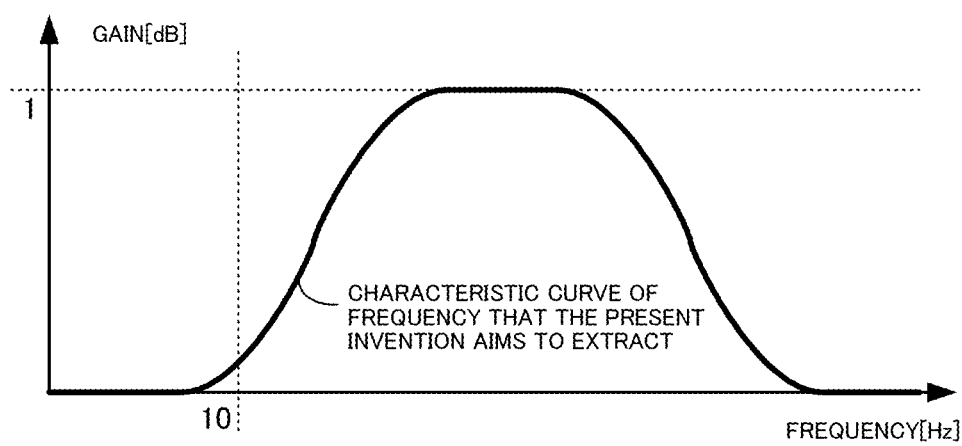
FIGS. 8(A) and 8(B) are diagrams showing characteristic setting examples of the extraction inverse characteristic filter with window (examples in a case that the predetermined frequency range that the present invention aims to exact is a band-pass characteristic) in the first embodiment of the electric power steering apparatus according to the present invention.
Figure 8:
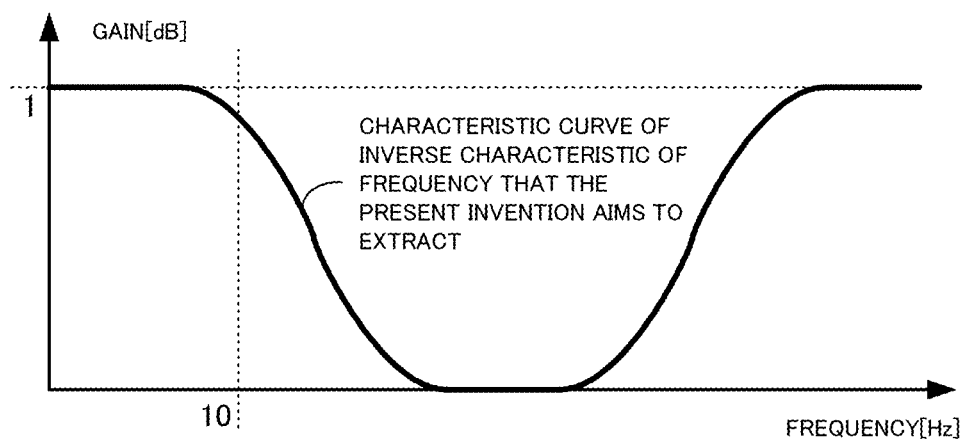

Furthermore, in the first embodiment, although "the predetermined frequency range" extracted by the vibration extraction filter 400 is set to a high-pass characteristic having a cutoff frequency of 10 [Hz], the present invention is not limited to this, it is also possible to set "the predetermined frequency range" extracted by the vibration extraction filter to a band-pass characteristic. FIGS. 8(A) and 8(B) show characteristic setting examples of the extraction inverse characteristic filter with window in the case that "the predetermined frequency range" extracted by the vibration extraction filter of the present invention is a band-pass characteristic.

Concretely, FIG. 8(A) shows a characteristic curve of a frequency range having the band-pass characteristic that is extracted by the vibration extraction filter. Further, FIG. 8(B) shows a characteristic curve of an inverse characteristic of the frequency range having the band-pass characteristic shown in FIG. 8(A) (i.e. a characteristic curve of an inverse characteristic that the extraction inverse characteristic filter with window has).

Here, the compensation value determining section 300 will be described.

As shown in FIG. 3, the compensation value determining section 300 determines the vibration suppression compensation value CV based on the vibration component VS having "the predetermined amplitude" and "the predetermined frequency range" extracted by the vibration extraction filter 400.

Here, in the case of applying the electric power steering apparatus according to the first embodiment, since the electric power steering state parameter is set to the motor angular speed (the motor angular speed signal), the vibration component VS having "the predetermined amplitude" and "the predetermined frequency range" extracted by the vibration extraction filter 400 is a dimension of the motor angular speed.

However, since the vibration suppression compensation value CV is a dimension of a current, it is necessary to convert the dimension of the motor angular speed into the dimension of the current in the compensation value determining section 300. With respect to the conversion method, even simply configuring by using a gain, sufficient effect can be obtained.

Further, since the motor and the electric power steering apparatus are rotary inertial systems, it is also possible to convert the dimension of the motor angular speed into the dimension of the current by using a motion equation expressed by the following Expression 1. Further, denominator of the motion equation of the following Expression 1 is set to an approximate differentiation characteristic that adds effects such as noises.

$$\frac{Js + D}{Kt(T_1 s + 1)} \qquad \text{[Expression 1]}$$

Where "J" is a motor (system) inertia term, "D" is a motor (system) viscous term, "Kt" is a torque constant, and "$T_1$" is an approximate differentiation time constant. Further, it is also possible to configure a phase lead/delay characteristic filter and a PID controller.

Here, in order to demonstrate the vibration compensation function according to the present invention, FIGS. 9(A) and 9(B) show steering wheel vibration suppression effects depending on the presence or absence of the vibration compensation function according to the present invention. Concretely, FIG. 9(A) shows the steering wheel vibration suppression effect in the case of absence of the vibration compensation function according to the present invention. Further, FIG. 9(B) shows the steering wheel vibration suppression effect in the case of presence of the vibration compensation function according to the present invention.

By comparing FIG. 9(A) with FIG. 9(B), it is clear that the steering torque vibration is reduced and simultaneously the vibration component appearing in the motor angular speed is also suppressed by applying the vibration compensation function according to the present invention to the electric power steering apparatus.

Figure 10:
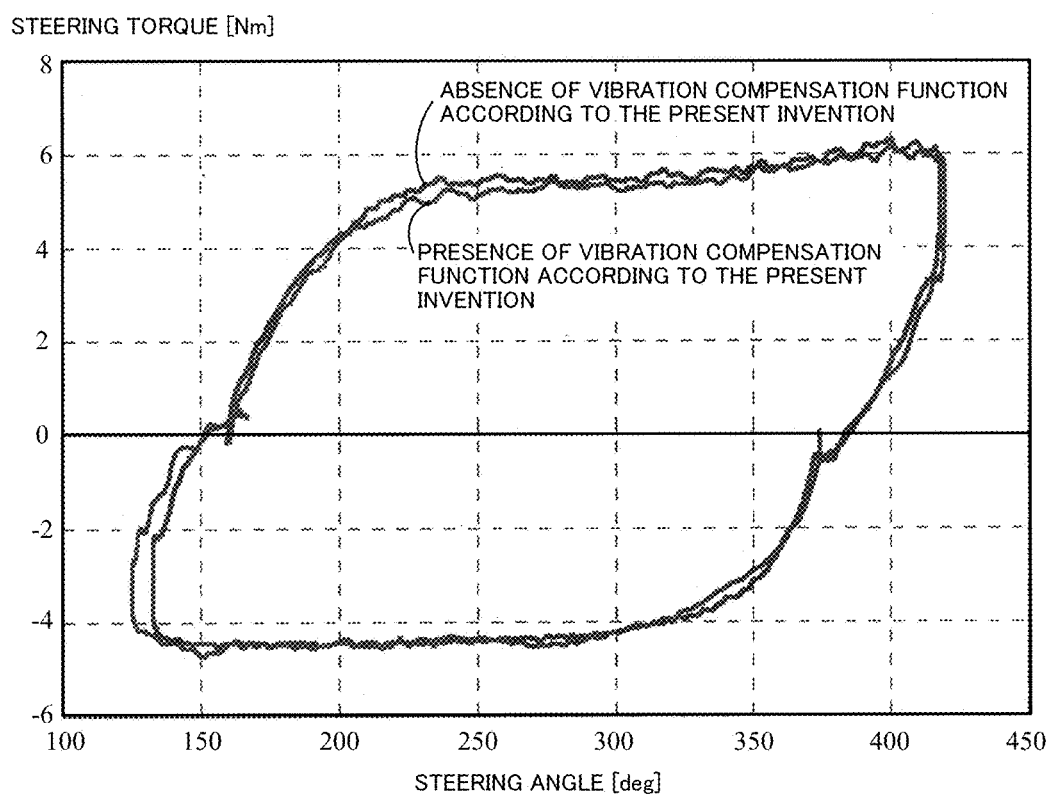
FIG. 10 is a diagram showing Lissajous patterns of a steering torque with respect to a steering angle depending on the presence or absence of the vibration compensation function according to the present invention.

FIG. 10 is a diagram showing Lissajous patterns of the steering torque with respect to a steering angle depending on the presence or absence of the vibration compensation function according to the present invention. From FIG. 10, it is possible to confirm that there is no effect on steering caused by the vibration compensation function according to the present invention since the Lissajous pattern in the case of applying the vibration compensation function according to the present invention to the electric power steering apparatus is the almost same as the Lissajous pattern in the case of not applying the vibration compensation function according to the present invention to the electric power steering apparatus.

Figure 9:
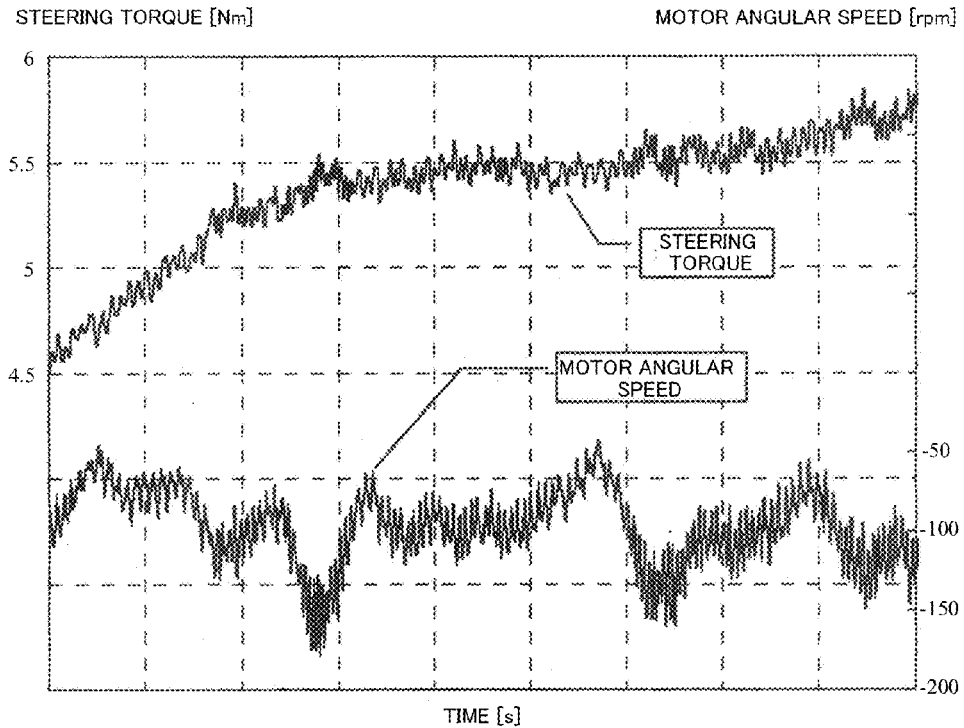
FIGS. 9(A) and 9(B) are diagrams showing steering wheel vibration suppression effects depending on the presence or absence of a vibration compensation function according to the present invention.
Figure 9:
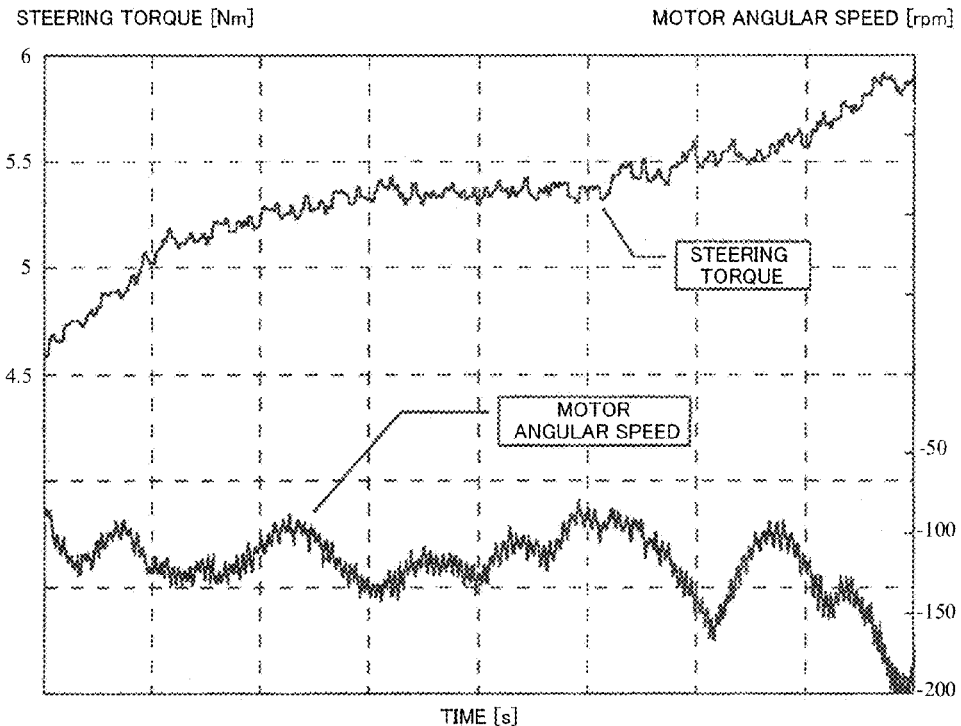

From results of FIGS. 9 and 10, it is possible to confirm that according to the present invention, it is possible to suppress the vibration component that is recognized as the uncomfortable feeling by the driver with suppressing effect on the steering feeling.

Second Embodiment

In the electric power steering apparatus, a main component of the vibration components that the present invention intends to compensate is the motor torque ripple component, and generally, with respect to the motor torque ripple component, the ripple width tends to become large depending on the current amount to be applied to the motor.

Here, if the value of "the predetermined amplitude" is not set to a value of the amplitude being capable of extracting the vibration component being the torque ripple, since it is impossible to perform an efficient vibration compensation, although setting "the predetermined amplitude" by using torque ripple amount at the time of a high current as a rough indication, conversely, in the vicinity of on-center, i.e. in the vicinity of a low current, the value of "the predetermined amplitude" that is preset by using the torque ripple amount at the time of the high current as the rough indication becomes too large.

Although it is possible to extract the vibration component having only arbitrary frequency range (the predetermined frequency range) by means of the extraction inverse characteristic filter with window 420 of the first embodiment described as above, since it is impossible sometimes to completely remove the driver's steering component of a low frequency range, in the case that the value of "the predetermined amplitude" being preset is large, when performing on-center steering, if the steering speed is large to some extent, the steering component is sometimes overlapped to a certain degree with the vibration extraction result based on the vibration extraction filter 400 of the first embodiment.

In order to solve this problem, the second embodiment makes it possible to set an optimum value of "the predetermined amplitude" coordinated with varying vibration components depending on an electric power steering state parameter relating to motor current amount such as the steering torque or the current command value (hereinafter also referred to as "a signal relating to motor current amount") by varying the value of "the predetermined amplitude" that is preset by the amplitude window judging section depending on "the signal relating to motor current amount".

That is, in the second embodiment, by increasing or decreasing (widening or narrowing) "the predetermined amplitude" that is preset by the amplitude window judging section depending on the electric power steering state parameter relating to motor current amount (the steering torque or the current command value), it becomes possible to improve the extraction accuracy of the torque ripple component and perform a high-accuracy vibration compensation.

In this way, in the case of applying the second embodiment of the present invention, it also becomes possible to efficiently suppress the vibration component without generating an increase in the viscous feeling in the vicinity of on-center.

Hereinafter, in the case of using the current command value as the electric power steering state parameter relating to motor current amount (the signal relating to motor current amount), the electric power steering apparatus according to the second embodiment of the present invention will be described.

Figure 11:
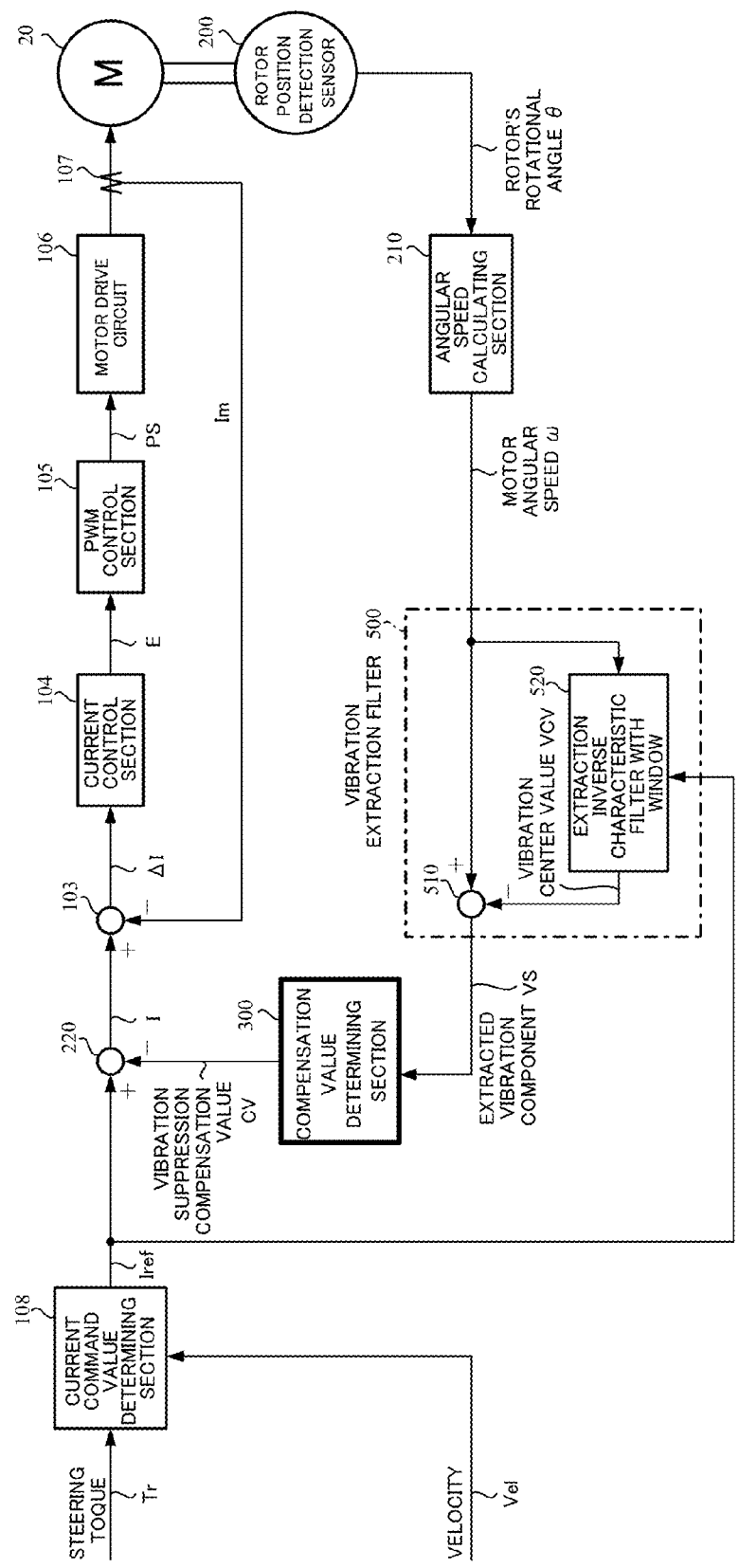
FIG. 11 is a block diagram showing a configuration example of the second embodiment of the electric power steering apparatus according to the present invention.

FIG. 11 is a block diagram showing a configuration example of the second embodiment of the electric power steering apparatus according to the present invention, the portion of the electric power steering apparatus is shown as corresponding to FIGS. 1 and 2, with respect to identical configurations, identical reference numerals are given without adding explanations. Moreover, also in the second embodiment, the motor angular speed (the motor angular speed signal) is used as the electric power steering state parameter.

Excepting the vibration extraction filter, since the configuration of the electric power steering apparatus according to the second embodiment of the present invention shown in FIG. 11 is the same as the configuration of the electric power steering apparatus according to the first embodiment of the present invention shown in FIG. 3, explanations about identical configurations are omitted.

With respect to the vibration extraction filter, the electric power steering apparatus according to the first embodiment of the present invention shown in FIG. 3 comprises the vibration extraction filter 400, whereas the electric power steering apparatus according to the second embodiment of the present invention shown in FIG. 11 comprises a vibration extraction filter 500.

Here, functions and operations of the vibration extraction filter 500 will be described.

As shown in FIG. 11, the vibration extraction filter 500 comprises a subtracting section 510 and an extraction inverse characteristic filter with window 520. Processes (operations) performed by the vibration extraction filter 500 are as follows.

At first, the vibration extraction filter 500 extracts a vibration component having an inverse characteristic of "the predetermined amplitude" and "the predetermined frequency range" based on the motor angular speed ω from the angular speed calculating section 210 by means of the extraction inverse characteristic filter with window 520.

Here, the vibration component having the inverse characteristic of "the predetermined amplitude" and "the predetermined frequency range" is outputted from the extraction inverse characteristic filter with window 520 as a vibration center value VCV.

Next, the vibration extraction filter 500 extracts the vibration component VS having "the predetermined amplitude" and "the predetermined frequency range" by calculating a difference between the extracted vibration component having the inverse characteristic of "the predetermined amplitude" and "the predetermined frequency range" (i.e. the vibration center value VCV) and the motor angular speed ω by means of a subtracting section 510.

Here, the vibration component VS having "the predetermined amplitude" and "the predetermined frequency range" extracted by the vibration extraction filter 500 is inputted into the compensation value determining section 300.

Figure 12:
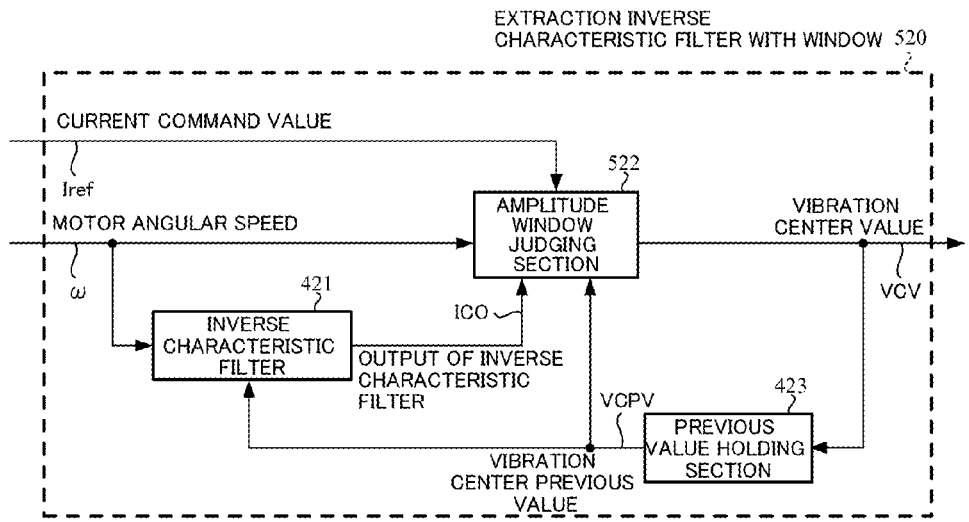
FIG. 12 is a block diagram showing a configuration example of the extraction inverse characteristic filter with window in the second embodiment of the electric power steering apparatus according to the present invention.

FIG. 12 is a block diagram showing a configuration example of the extraction inverse characteristic filter with window 520 in the second embodiment of the electric power steering apparatus according to the present invention. Based on FIG. 12, functions and operations of the extraction inverse characteristic filter with window 520 will be described.

As shown in FIG. 12, the extraction inverse characteristic filter with window 520 comprises an inverse characteristic filter 421 that has the inverse characteristic of "the predetermined frequency range", an amplitude window judging section 522 that comprises a means of increasing or decreasing "the predetermined amplitude" that is preset depending on the current command value, and a previous value holding section 423 that holds a vibration center previous value.

With respect to the inputted motor angular speed ω, processes (operations) performed by the extraction inverse characteristic filter with window 520 are as follows.

At first, the extraction inverse characteristic filter with window 520 inputs the motor angular speed ω to the inverse characteristic filter 421 and then outputs an output ICO of the inverse characteristic filter 421 to the amplitude window judging section 522. Here, the inverse characteristic of "the predetermined frequency" that the inverse characteristic filter 421 has, is the inverse characteristic of frequency characteristic that the present invention aims to extract shown in such as FIG. 5(B).

Next, the extraction inverse characteristic filter with window 520 performs an amplitude window judging process that judges whether the motor angular speed ω is within an amplitude window or not based on the motor angular speed ω, the output ICO of the inverse characteristic filter 421 and a vibration center previous value VCPV from the previous value holding section 423 after setting "the predetermined amplitude" by increasing or decreasing "the predetermined amplitude" that is preset depending on the current command value Iref from the current command value determining section 108 by means of the amplitude window judging section 522.

In the case of judging that the motor angular speed ω is within the amplitude window by the amplitude window judging process, the amplitude window judging section 522 outputs the output ICO of the inverse characteristic filter 421 as the vibration center value VCV.

On the other hand, in the case of judging that the motor angular speed ω is outside the amplitude window by the amplitude window judging process, the amplitude window judging section 522 outputs a value obtained by adding "the predetermined amplitude" to the motor angular speed ω or subtracting "the predetermined amplitude" from the motor angular speed ω as the vibration center value VCV.

Further, the amplitude window judging section 522 outputs the vibration center value VCV from the amplitude window judging section 522 to both the subtracting section 410 and the previous value holding section 423. The previous value holding section 423 holds the inputted vibration center value VCV as the vibration center previous value VCPV.

Here, "the amplitude window" called by the amplitude window judging section 522 means a range being the vibration center previous value VCPV±"the predetermined amplitude", and the above "the predetermined amplitude" is "the amplitude window" that is obtained (set) by increasing or decreasing "the predetermined amplitude" that is preset depending on the current command value Iref.

Figure 13:
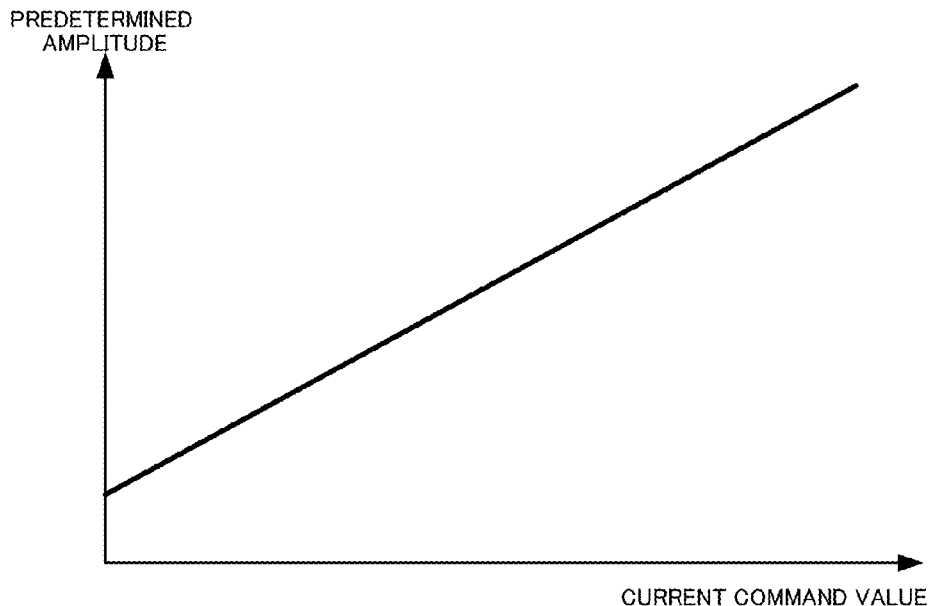
FIG. 13 is a diagram showing one variable amplitude setting example that varies a predetermined amplitude depending on a current command value in a vibration extraction filter of the second embodiment of the electric power steering apparatus according to the present invention.

FIG. 13 shows one variable amplitude setting example that in the extraction inverse characteristic filter with window 520 of the second embodiment, the amplitude window judging section 522 varies the predetermined amplitude depending on the current command value Iref. The amplitude window judging section 522 sets the predetermined amplitude so as to for example, as shown in FIG. 13, increase the predetermined amplitude depending on an increase in the current command value Iref.

In this way, if applying the second embodiment, it becomes possible to improve the extraction accuracy of the torque ripple component and to perform the high-accuracy vibration compensation without generating an increase in the viscous feeling in the vicinity of on-center.

Third Embodiment

As described above, the second embodiment adopts a configuration that varies the predetermined amplitude depending on the current command value or the steering torque. However, even in the case of adopting the configuration described in the second embodiment, in order to compensate vibrations caused by motor idling, i.e. vibrations caused by such as motor's cogging torque, loss torque variation and the mechanical mechanism, even in the vicinity of a low current, there is a possibility to set "the predetermined amplitude" that is set depending on the current command value to a certain level of value.

In this case, particularly, when a steering operation starts from the center, sometimes the viscous feeling occurs. Further, in the case of a high-speed steering, due to sampling on realization, sometimes it is impossible to extract waveforms of the vibration component with a high accuracy. Moreover, when steering at a high speed, since the vibration frequency of the torque ripple becomes very high, it is difficult to be recognized as the vibration by the driver, therefore, it is also considered that the need for performing compensation itself disappears with respect to such the vibration.

In order to solve these problems, the third embodiment calculates sensitive gains for changing a proportion of vibration suppression compensation depending on the electric power steering state parameter relating to motor current amount and the electric power steering state parameter relating to speed, and obtains the vibration suppression compensation value CV by multiplying the vibration suppression compensation value CV0 determined based on the vibration component VS having "the predetermined amplitude" and "the predetermined frequency rang" extracted by the vibration extraction filter by the calculated sensitive gains by means of the compensation value determining section for determining the vibration suppression compensation value CV.

Here, the electric power steering state parameter relating to motor current amount means the signal relating to motor current amount, i.e. the steering torque or the current command value. Further, the electric power steering state parameter relating to speed means the signal relating to speed, i.e. the steering speed or the motor angular speed.

Concretely, the third embodiment, in a state that the signal relating to motor current amount is low, i.e. in the case that the electric power steering state parameter relating to motor current amount is less than or equal to a predetermined threshold, suppresses the viscous feeling at the time of start of the steering operation in the vicinity of on-center by decreasing the sensitive gain concerning the signal relating to motor current amount to decrease the proportion of the vibration suppression compensation value.

Further, the third embodiment, in the case that the signal relating to speed indicates a high rotational speed, i.e. in the case that the electric power steering state parameter relating to speed is more than or equal to a predetermined threshold, softens the effect caused by degradation of extraction accuracy of the vibration waveform by decreasing the sensitive gain concerning the signal relating to speed to decrease the proportion of the vibration suppression compensation value.

That is, when the signal relating to speed (the steering speed or the motor angular speed) becomes high, the vibration frequency of the torque ripple becomes high. With a relation to a sampling time, since the extraction accuracy of the vibration waveform degrades when the vibration frequency becomes high, therefore, the accuracy of the vibration compensation degrades, and conversely, there is a possibility to generate an unintended ripple and the steering uncomfortable feeling.

However, since the third embodiment increases or decreases the proportion of compensation depending on the signal relating to speed (the steering speed or the motor angular speed), by decreasing the vibration suppression compensation value before the accuracy degradation of the vibration compensation, it is possible to avoid the above problem.

Hereinafter, in the case of using the current command value as the electric power steering state parameter relating to motor current amount and using the motor angular speed as the electric power steering state parameter relating to speed, the electric power steering apparatus according to the third embodiment of the present invention will be described.

Figure 14:
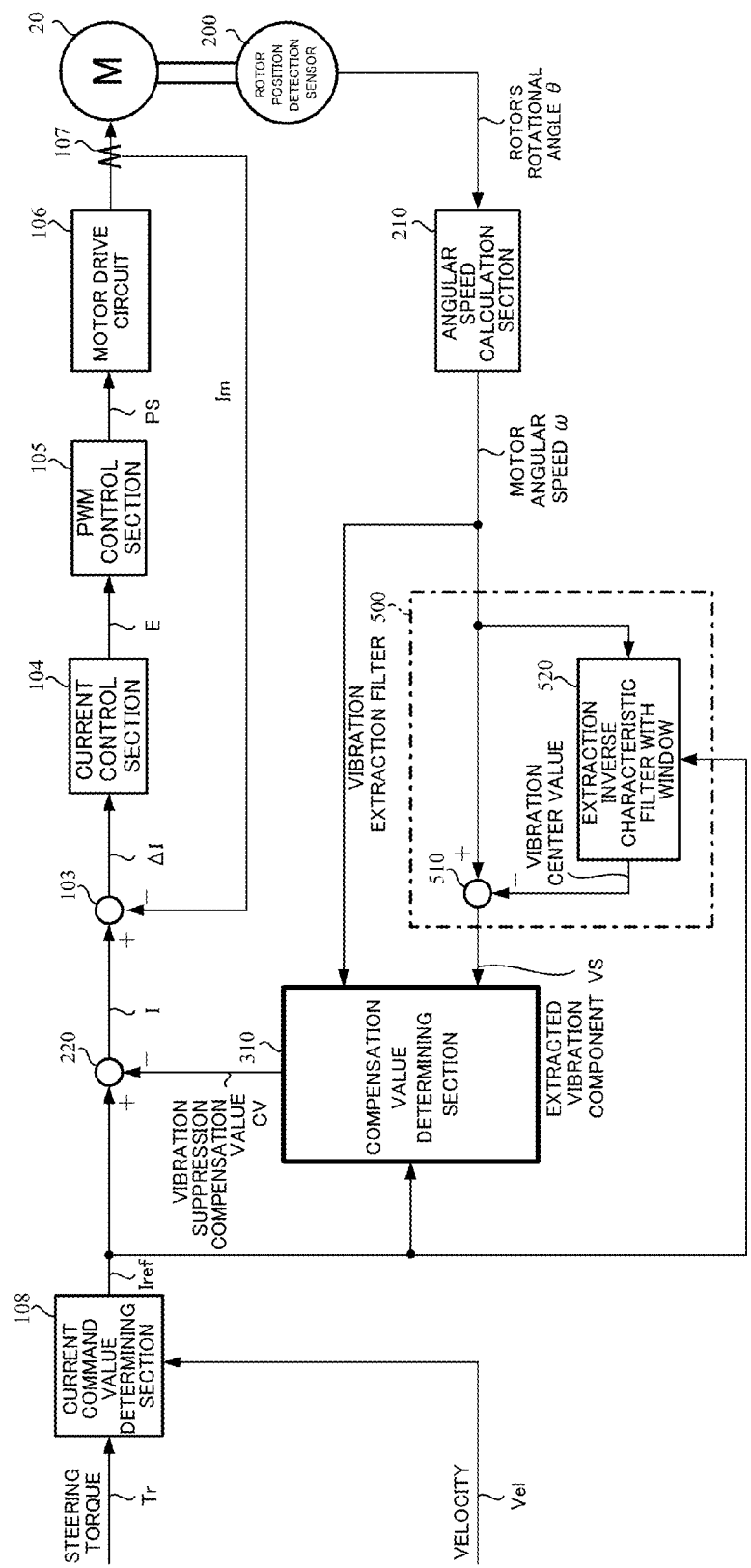
FIG. 14 is a block diagram showing a configuration example of the third embodiment of the electric power steering apparatus according to the present invention.

FIG. 14 is a block diagram showing a configuration example of the third embodiment of the electric power steering apparatus according to the present invention, the portion of the electric power steering apparatus is shown as corresponding to FIGS. 1 and 2, with respect to identical configurations, identical reference numerals are given without adding explanations. Moreover, also in the third embodiment, the motor angular speed (the motor angular speed signal) is used as the electric power steering state parameter.

Excepting the compensation value determining section, since the configuration of the electric power steering apparatus according to the third embodiment of the present invention shown in FIG. 14 is the same as the configuration of the electric power steering apparatus according to the second embodiment of the present invention shown in FIG. 11, explanations about identical configurations are omitted.

With respect to the compensation value determining section, the electric power steering apparatus according to the second embodiment of the present invention shown in FIG. 11 comprises the compensation value determining section 300, whereas the electric power steering apparatus according to the third embodiment of the present invention shown in FIG. 14 comprises a compensation value determining section 310.

Figure 15:
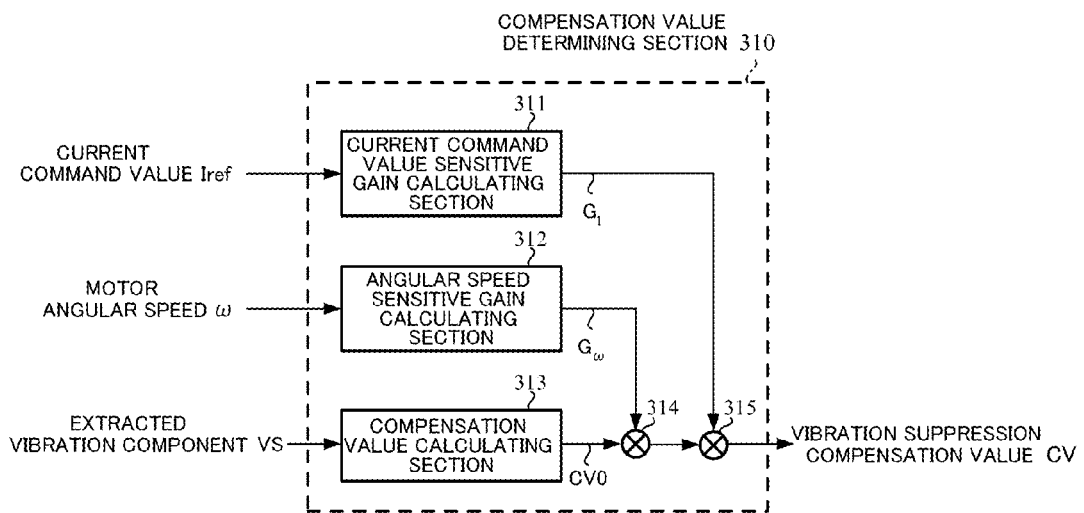
FIG. 15 is a block diagram showing a configuration example of a compensation value determining section of the third embodiment of the electric power steering apparatus according to the present invention.
Figure 16:
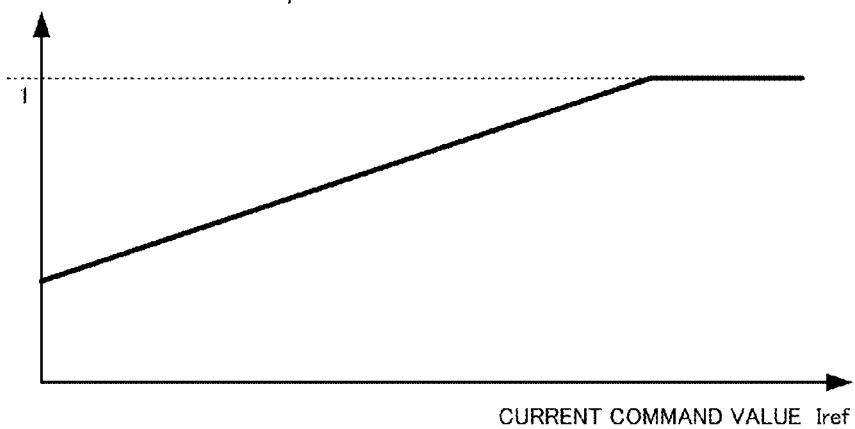
FIG. 16(A) is a diagram showing one current sensitive gain setting example and FIG. 16(B) is a diagram showing one angular speed sensitive gain setting example in the compensation value determining section of the third embodiment of the electric power steering apparatus according to the present invention.
Figure 16:
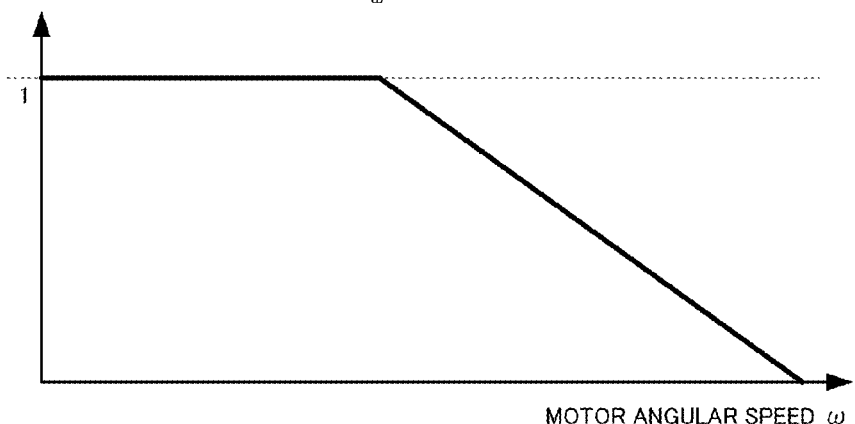

FIG. 15 is a block diagram showing a configuration example of the compensation value determining section 310. Further, FIG. 16(A) is a diagram showing one current sensitive gain setting example and FIG. 16(B) is a diagram showing one angular speed sensitive gain setting example in the compensation value determining section 310 shown in FIG. 15. Hereinafter, with reference to FIGS. 15, 16(A) and 16(B), functions and operations of the compensation value determining section 310 will be described.

As shown in FIG. 15, the compensation value determining section 310 comprises a current command value sensitive gain calculating section 311, an angular speed sensitive gain calculating section 312, a compensation value calculating section 313, a multiplying section 314 and a multiplying section 315. Processes (operations) performed by the compensation value determining section 310 are as follows.

At first, the compensation value determining section 310 calculates a current command value sensitive gain $G_I$ based on the current command value Iref from the current command value determining section 108 by means of the current command value sensitive gain calculating section 311, calculates an angular speed sensitive gain $G_\omega$ based on the motor angular speed $\omega$ from the angular speed calculating section 210 by means of the angular speed sensitive gain calculating section 312, and calculates the vibration suppression compensation value CV0 based on the vibration component VS extracted by the vibration extraction filter 500 by means of the compensation value calculating section 313.

Here, it is possible that the current command value sensitive gain calculating section 311 calculates the current command value sensitive gain $G_I$ corresponding to the current command value Iref based on such as the current sensitive gain setting example shown in FIG. 16(A).

Further, it is possible that the angular speed sensitive gain calculating section 312 calculates the angular speed sensitive gain $G_\omega$ corresponding to the motor angular speed $\omega$ based on such as the angular speed sensitive gain setting example shown in FIG. 16(B).

Moreover, since the configuration of the compensation value calculating section 313 is the same as the configuration of the compensation value determining section 300 of the first embodiment, explanations about the compensation value calculating section 313 are omitted. Further, the compensation value determined by the compensation value determining section 300 of the first embodiment is regarded as the vibration suppression compensation value CV, whereas the compensation value calculated by the compensation value calculating section 313 of the third embodiment is regarded as the vibration suppression compensation value CV0.

Next, the compensation value determining section 310 obtains the vibration suppression compensation value CV by multiplying the vibration suppression compensation value CV0 by the current command value sensitive gain $G_I$ and the angular speed sensitive gain $G_\omega$ by means of the multiplying section 314 and the multiplying section 315.

Here, the vibration suppression compensation value CV determined by the compensation value determining section 310 is inputted into the subtracting section 220.

In this way, if applying the third embodiment, it is possible to suppress the viscous feeling at the time of start of the steering operation in the vicinity of on-center that occurs in the state that the signal relating to motor current amount is low, and simultaneously it is also possible to resolve the effect caused by degradation of extraction accuracy of the vibration waveform that occurs in the case that the signal relating to speed indicates a high rotational speed.

Fourth Embodiment

Generally, in the electric power steering apparatus, when the velocity becomes high, the amplitude of the vibration component to desire to suppress tends to increase. On the contrary, in the vibration extraction filter of the present invention, if the value of "the predetermined amplitude" that is preset by the amplitude window judging section of the extraction inverse characteristic filter with window is insufficient, there is a possibility that it is impossible to expect the vibration suppression effect.

In order to solve such a problem, the fourth embodiment makes it possible to set an optimum value of "the predetermined amplitude" coordinated with varying vibration components depending on the velocity by varying the value of "the predetermined amplitude" that is preset by the amplitude window judging section in extracting the vibration component depending on the velocity.

As a setting example of varying the value of "the predetermined amplitude" depending on the velocity, setting "the predetermined amplitude" so as to increase "the predetermined amplitude" as the velocity becomes high.

Further, in the fourth embodiment, it is also possible to vary the proportion of the vibration suppression compensation depending on the velocity. In this way, it is possible to increase the vibration suppression effect with respect to the vibration change of the vibration component that changes depending on the velocity.

That is, in the electric power steering apparatus, when the velocity is high, since the amplitude of the vibration component to aim to compensate such as the eigenvalue vibration also tends to increase, the fourth embodiment increases or decreases the value of "the predetermined amplitude" that is preset by the amplitude window judging section depending on the velocity in extracting the vibration component, and also increases or decreases the velocity sensitive gain for changing the proportion of the vibration suppression compensation depending on the velocity in determining the vibration suppression compensation value CV depending on the extracted vibration component.

Further, when the velocity becomes high, since the driver frequently performs the micro steering in the vicinity of on-center, in applying the first embodiment, the second embodiment or the third embodiment described above, sometimes it becomes easy to feel the viscous feeling.

In order to solve such a problem, in the fourth embodiment, when the velocity is high (i.e. in the case of being more than or equal to a predetermined velocity), it is also possible to set not only the proportion of the vibration suppression compensation but also the predetermined amplitude small.

Hereinafter, in the case of using the current command value as the electric power steering state parameter relating to motor current amount and using the motor angular speed as the electric power steering state parameter relating to speed, the electric power steering apparatus according to the fourth embodiment of the present invention will be described.

Figure 17:
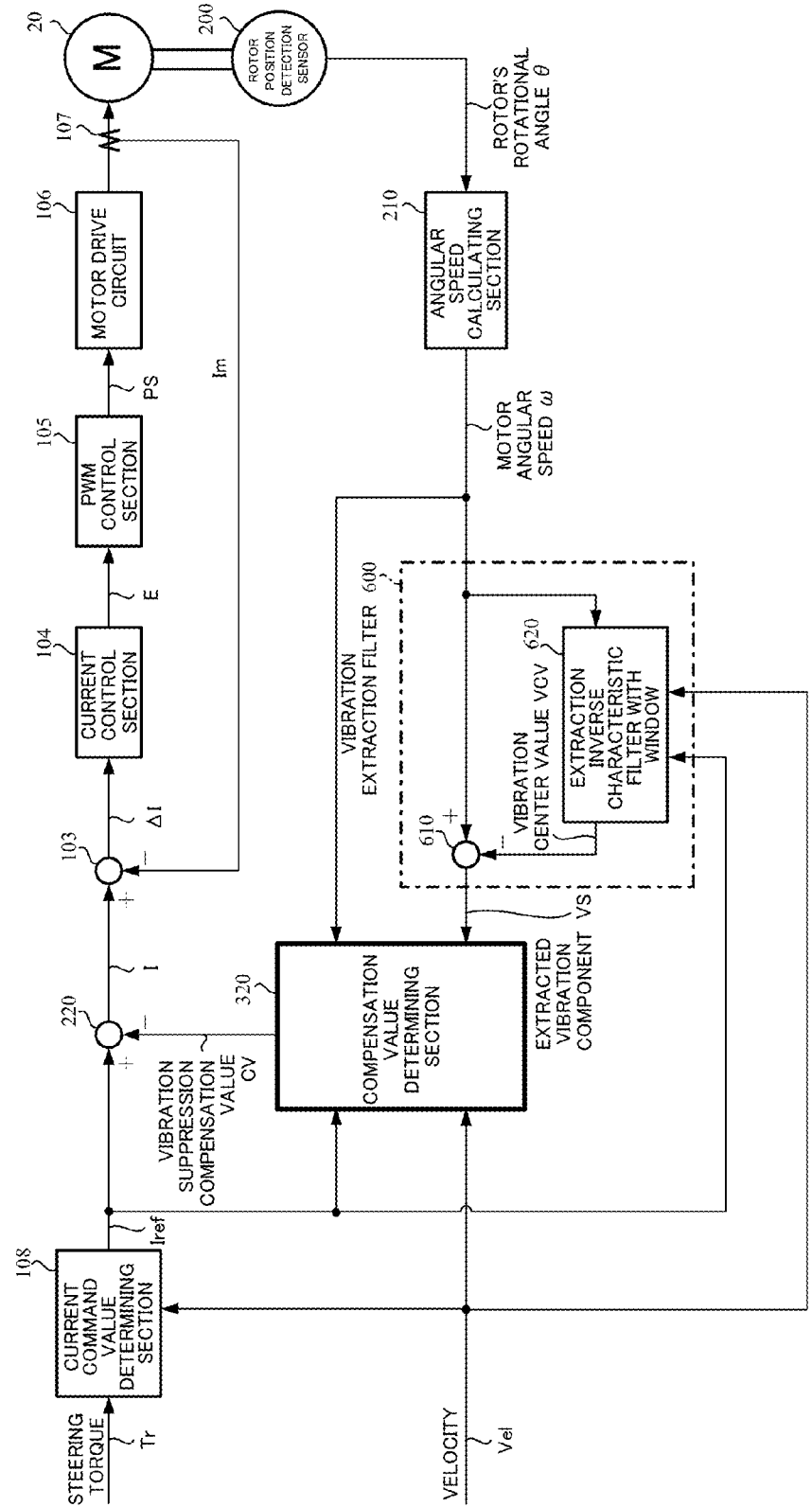
FIG. 17 is a block diagram showing a configuration example of the fourth embodiment of the electric power steering apparatus according to the present invention.
Figure 18:
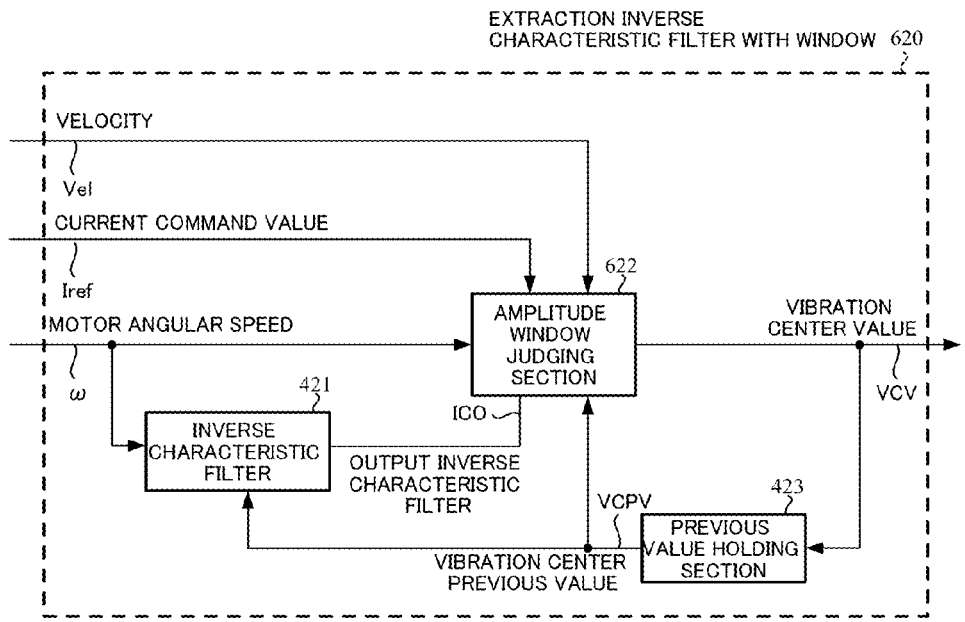
FIG. 18 is a block diagram showing a configuration example of the extraction inverse characteristic filter with window in the fourth embodiment of the electric power steering apparatus according to the present invention.
Figure 19:
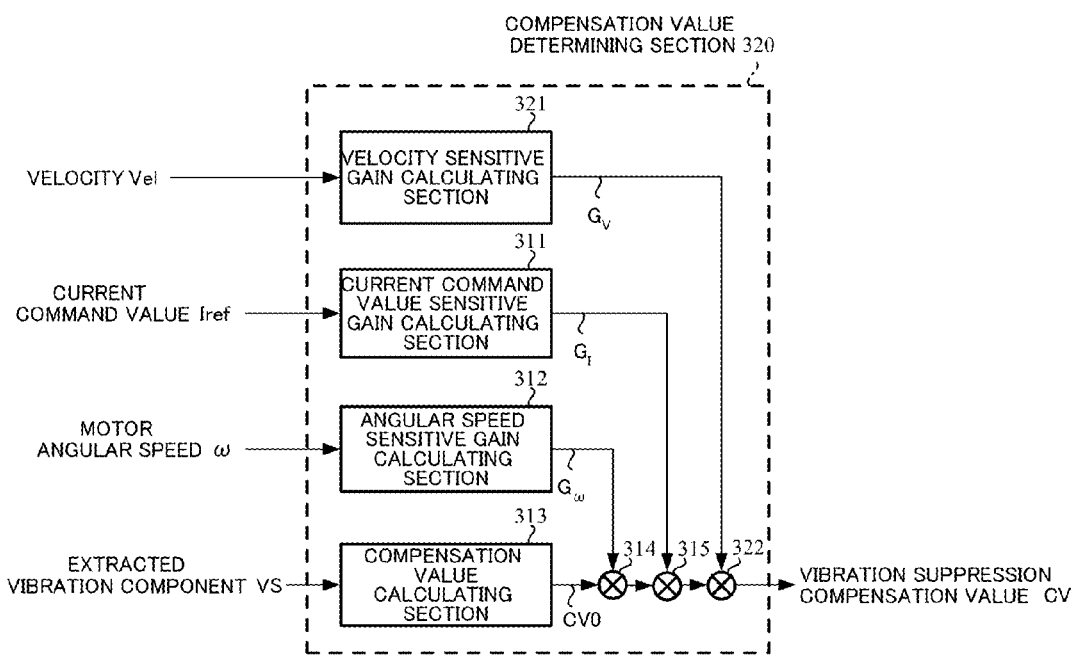
FIG. 19 is a block diagram showing a configuration example of the compensation value determining section of the fourth embodiment of the electric power steering apparatus according to the present invention.

FIG. 17 is a block diagram showing a configuration example of the fourth embodiment of the electric power steering apparatus according to the present invention, the portion of the electric power steering apparatus is shown as corresponding to FIGS. 1 and 2, with respect to identical configurations, identical reference numerals are given without adding explanations. Further, FIG. 18 is a block diagram showing a configuration example of an extraction inverse characteristic filter with window 620 in the fourth embodiment. FIG. 19 is a block diagram showing a configuration example of a compensation value determining section 320 of the fourth embodiment. Moreover, also in the fourth embodiment, the motor angular speed (the motor angular speed signal) is used as the electric power steering state parameter.

With reference to FIGS. 17, 18 and 19, functions and the whole operation of the electric power steering apparatus according to the fourth embodiment of the present invention will be described in detail.

As shown in FIG. 17, a current command value determining section 108 determines a current command value Iref based on a steering torque Tr detected by the torque sensor 10 and a velocity Vel detected by the velocity sensor 12. The determined current command value Iref is inputted into a subtracting section 220.

Meanwhile, a motor current Im being applied to a motor 20 is detected by a motor current detecting circuit 107, and the detected motor current Im is inputted into a subtracting section 103.

Further, a rotor's rotational angle θ being a rotor position signal is detected by a rotor position detection sensor 200 for detecting a rotor position of the motor 20. An angular speed calculating section 210 calculates a motor angular speed ω based on the rotor's rotational angle θ detected by the rotor position detection sensor 200. Then, the calculated motor angular speed ω is inputted into a vibration extraction filter 600 being one substantial part of the present invention.

The vibration extraction filter 600 extracts a vibration component having a predetermined amplitude and a predetermined frequency range based on the inputted motor angular speed ω, the current command value Iref and the velocity Vel, and the extracted vibration component VS is inputted into a compensation value determining section 320 being another substantial part of the present invention.

Next, the compensation value determining section 320 determines a vibration suppression compensation value CV based on the extracted vibration component VS, the motor angular speed ω, the current command value Iref and the velocity Vel, and the determined vibration suppression compensation value CV is inputted into the subtracting section 220.

Then, a vibration-compensated current command value I is calculated by subtracting the vibration suppression compensation value CV from the current command value Iref in the subtracting section 220, that is, by being configured so as to feed back the vibration suppression compensation value CV to the current command value Iref. The calculated vibration-compensated current command value I is inputted into a subtracting section 103.

Then, the subtracting section 103 obtains a deviation ΔI (=I−Im) between the vibration-compensated current command value I and the motor current Im of the motor 20 being fed back, the obtained deviation ΔI is controlled by a current control section 104, a controlled current control value E is inputted into a PWM control section 105 so as to calculate a duty, and the motor 20 is driven by a PWM signal PS that the duty is calculated through a motor drive circuit 106.

Here, functions and operations of the vibration extraction filter 600 will be described.

As shown in FIG. 17, the vibration extraction filter 600 comprises a subtracting section 610 and an extraction inverse characteristic filter with window 620. Processes (operations) performed by the vibration extraction filter 600 are as follows.

At first, the vibration extraction filter 600 extracts a vibration component having an inverse characteristic of "the predetermined amplitude" and "the predetermined frequency range" based on the motor angular speed ω from the angular speed calculating section 210, the current command value Iref and the velocity Vel by means of the extraction inverse characteristic filter with window 620.

Here, the vibration component having the inverse characteristic of "the predetermined amplitude" and "the predetermined frequency range" is outputted from the extraction inverse characteristic filter with window 620 as a vibration center value VCV.

Next, the vibration extraction filter 600 extracts the vibration component VS having "the predetermined amplitude" and "the predetermined frequency range" by calculating a difference between the extracted vibration component having the inverse characteristic of "the predetermined amplitude" and "the predetermined frequency range" (i.e. the vibration center value VCV) and the motor angular speed ω by means of a subtracting section 610.

Here, the vibration component VS having "the predetermined amplitude" and "the predetermined frequency range" extracted by the vibration extraction filter 600 is inputted into the compensation value determining section 320.

Since "The inverse characteristic" called by the fourth embodiment is the same as "The inverse characteristic" called by the first embodiment, explanations about "The inverse characteristic" called by the fourth embodiment are omitted.

Based on FIG. 18, functions and operations of the extraction inverse characteristic filter with window 620 of the fourth embodiment will be described.

As shown in FIG. 18, the extraction inverse characteristic filter with window 620 comprises an inverse characteristic filter 421 that has the inverse characteristic of "the predetermined frequency range", an amplitude window judging section 622 that comprises a means of increasing or decreasing "the predetermined amplitude" that is preset depending on the current command value and the velocity, and a previous value holding section 423 that holds a vibration center previous value.

With respect to the inputted motor angular speed ω, processes (operations) performed by the extraction inverse characteristic filter with window 620 are as follows.

At first, the extraction inverse characteristic filter with window 620 inputs the motor angular speed ω to the inverse characteristic filter 421 and then outputs an output ICO of the inverse characteristic filter 421 to the amplitude window judging section 622. Here, the inverse characteristic of "the predetermined frequency" that the inverse characteristic filter 421 has, is the inverse characteristic of frequency characteristic that the present invention aims to extract shown in such as FIG. 5(B).

Next, the extraction inverse characteristic filter with window 620 performs an amplitude window judging process that judges whether the motor angular speed ω is within an amplitude window or not based on the motor angular speed ω, the output ICO of the inverse characteristic filter 421 and a vibration center previous value VCPV from the previous value holding section 423 after setting "the predetermined amplitude" by increasing or decreasing "the predetermined amplitude" that is preset depending on the current command value Iref from the current command value determining section 108 and the velocity Vel by means of the amplitude window judging section 622.

In the case of judging that the motor angular speed ω is within the amplitude window by the amplitude window judging process, the amplitude window judging section 622 outputs the output ICO of the inverse characteristic filter 421 as the vibration center value VCV.

On the other hand, in the case of judging that the motor angular speed ω is outside the amplitude window by the amplitude window judging process, the amplitude window judging section 622 outputs a value obtained by adding "the predetermined amplitude" to the motor angular speed ω or subtracting "the predetermined amplitude" from the motor angular speed ω as the vibration center value VCV.

Further, the amplitude window judging section 622 outputs the vibration center value VCV from the amplitude window judging section 622 to both the subtracting section 610 and the previous value holding section 423. The previous value holding section 423 holds the inputted vibration center value VCV as the vibration center previous value VCPV.

Here, "the amplitude window" called by the amplitude window judging section 622 means a range being the vibration center previous value VCPV±"the predetermined amplitude", and the above "the predetermined amplitude" is "the amplitude window" that is obtained (set) by increasing or decreasing "the predetermined amplitude" that is preset depending on the current command value Iref and the velocity Vel.

In this way, in the fourth embodiment, by means of the vibration extraction filter 600, it is possible to extract the vibration component having the predetermined amplitude and the predetermined frequency range.

Hereinafter, with reference to FIG. 19, functions and operations of the compensation value determining section 320 will be described.

As shown in FIG. 19, the compensation value determining section 320 comprises a velocity sensitive gain calculating section 321, a current command value sensitive gain calculating section 311, an angular speed sensitive gain calculating section 312, a compensation value calculating section 313, a multiplying section 314, a multiplying section 315 and a multiplying section 322. Processes (operations) performed by the compensation value determining section 320 are as follows.

At first, the compensation value determining section 320 calculates a velocity sensitive gain $G_V$ based on the velocity Vel by means of the velocity sensitive gain calculating section 321, calculates a current command value sensitive gain $G_I$ based on the current command value Iref from the current command value determining section 108 by means of the current command value sensitive gain calculating section 311, calculates an angular speed sensitive gain $G_\omega$ based on the motor angular speed ω from the angular speed calculating section 210 by means of the angular speed sensitive gain calculating section 312, and calculates the vibration suppression compensation value CV0 based on the vibration component VS extracted by the vibration extraction filter 500 by means of the compensation value calculating section 313.

Moreover, since the configuration of the compensation value calculating section 313 is the same as the configuration of the compensation value determining section 300 of the first embodiment, explanations about the compensation value calculating section 313 are omitted. Further, the compensation value determined by the compensation value determining section 300 of the first embodiment is regarded as the vibration suppression compensation value CV, whereas the compensation value calculated by the compensation value calculating section 313 of the fourth embodiment is regarded as the vibration suppression compensation value CV0.

Next, the compensation value determining section 320 obtains the vibration suppression compensation value CV by multiplying the vibration suppression compensation value CV0 by the angular speed sensitive gain $G_\omega$, the current command value sensitive gain $G_I$ and the velocity sensitive gain $G_V$ by means of the multiplying section 314, the multiplying section 315 and the multiplying section 322. Here, the vibration suppression compensation value CV determined by the compensation value determining section 320 is inputted into the subtracting section 220.

In this way, if applying the fourth embodiment, since varying not only the predetermined amplitude but also the proportion of the vibration suppression compensation depending on the velocity, it is possible to increase the vibration suppression effect with respect to the vibration change of the vibration component that changes depending on the velocity, and it is also possible to resolve the viscous feeling caused by the micro steering in the vicinity of on-center that is frequently performed.

Furthermore, in the above-described embodiments (the first embodiment, the second embodiment, the third embodiment and the fourth embodiment), although the motor angular speed signal is used as the electric power steering state parameter, the electric power steering state parameter used in the present invention is not limited to the motor angular speed signal, if a signal is capable of detecting the vibration component, it is possible to use the signal as the electric power steering state parameter.

It is possible to use a signal such as the steering torque detected by the torque sensor, the steering speed, the power-supply voltage or the voltage being applied to the motor as the electric power steering state parameter.

Further, in the present invention, of course it is possible to use an energy calculation value such as a result of multiplying the steering torque by the steering speed as steering energy, a result of multiplying the current command value by the torque constant and the motor angular speed as motor kinetic energy, a result of multiplying the detected motor current by the torque constant and the motor angular speed, a result of multiplying the current command value by the power-supply voltage or a result of multiplying the detected motor current by the power-supply voltage as the electric power steering state parameter.

EXPLANATION OF REFERENCE NUMERALS 1 handle (steering wheel)
10 torque sensor
12 velocity sensor
13 battery
20 motor
30 control unit
101 steering assist command value calculating section
102 maximum output limiting section
103 subtracting section
104 current control section
105 PWM control section
106 motor drive circuit
107 motor current detecting circuit
108 current command value determining section
200 rotor position detection sensor
210 angular speed calculating section
220 subtracting section
300, 310, 320 compensation value determining section
311 current command value sensitive gain calculating section
312 angular speed sensitive gain calculating section
313 compensation value calculating section
314, 315, 322 multiplying section
321 velocity sensitive gain calculating section
400, 500, 600 vibration extraction filter
410, 510, 610 subtracting section
420, 520, 620 extraction inverse characteristic filter with window
421 inverse characteristic filter
422, 522, 622 amplitude window judging section
423 previous value holding section

The invention claimed is:

1. An electric power steering apparatus that provides a steering system of a vehicle with an assist force generated by a motor, comprising:
   a current command value determining section that determines a current command value based on a steering torque and a velocity;
   a vibration extraction filter that extracts a vibration component having a predetermined amplitude and a predetermined frequency range depending on an electric power steering state parameter; and
   a compensation value determining section that determines a vibration suppression compensation value based on said vibration component extracted by said vibration extraction filter,
   wherein vibrations of said motor are suppressed by feeding back said vibration suppression compensation value determined by said compensation value determining section to said current command value determined by said current command value determining section,
   wherein said vibration extraction filter
   comprises an extraction inverse characteristic filter with window that calculates a vibration center value based on said electric power steering state parameter and depending on an inverse characteristic of said predetermined frequency range, and
   extracts said vibration component having said predetermined amplitude and said predetermined frequency range based on a difference between said vibration center value and said electric power steering state parameter,
   wherein said extraction inverse characteristic filter with window comprises an inverse characteristic filter that has said inverse characteristic of said predetermined frequency range and an amplitude window judging section that said predetermined amplitude is preset,
   wherein said extraction inverse characteristic filter with window inputs said electric power steering state parameter to said inverse characteristic filter and then outputs an output of said inverse characteristic filter to said amplitude window judging section,
   wherein said amplitude window judging section
   performs an amplitude window judging process that judges whether said electric power steering state parameter is within an amplitude window being said previous value of said vibration center value±said predetermined amplitude or not based on said electric power steering state parameter, said output of said inverse characteristic filter and a previous value of said vibration center value,
   in a case of judging that said electric power steering state parameter is within said amplitude window, outputs said output of said inverse characteristic filter as said vibration center value, and
   in a case of judging that said electric power steering state parameter is outside said amplitude window, outputs a value obtained by adding said predetermined amplitude to said electric power steering state parameter or subtracting said predetermined amplitude from said electric power steering state parameter as said vibration center value.

2. The electric power steering apparatus according to claim 1, wherein said predetermined frequency range is a frequency range except vibration components of a frequency range that said electric power steering apparatus aims to transmit to a person who steers a steering wheel.

3. The electric power steering apparatus according to claim 2, wherein said frequency range that said electric power steering apparatus aims to transmit to said person who steers said steering wheel is a frequency range being less than or equal to about 10[Hz] that road surface information, tire conditions and so on are included in.

4. The electric power steering apparatus according to claim 1, wherein said predetermined frequency range is a frequency range except a frequency range that said electric power steering apparatus aims to transmit to a person who steers a steering wheel and a frequency range being more than or equal to a frequency limited by sampling and so on that vibration extraction accuracy becomes worse.

5. The electric power steering apparatus according to claim 1, wherein said electric power steering state parameter is an electric power steering state parameter relating to motor current amount or an electric power steering state parameter relating to speed.

6. The electric power steering apparatus according to claim 5, wherein said electric power steering state parameter relating to motor current amount is said steering torque, said current command value or a detected motor current.

7. The electric power steering apparatus according to claim 5, wherein said electric power steering state parameter relating to speed is a steering speed or a motor angular speed.

8. The electric power steering apparatus according to claim 1, wherein said electric power steering state parameter is a result of multiplying said steering torque by a steering speed as steering energy, a result of multiplying said current command value by a torque constant and a motor angular speed as motor kinetic energy or a result of multiplying a detected motor current by a power-supply voltage as motor electric energy.

9. An electric power steering apparatus that provides a steering system of a vehicle with an assist force generated by a motor, comprising:
a current command value determining section that determines a current command value based on a steering torque and a velocity;
a vibration extraction filter that extracts a vibration component having a predetermined amplitude and a predetermined frequency range depending on an electric power steering state parameter; and
a compensation value determining section that determines a vibration suppression compensation value based on said vibration component extracted by said vibration extraction filter,
wherein vibrations of said motor are suppressed by feeding back said vibration suppression compensation value determined by said compensation value determining section to said current command value determined by said current command value determining section,
wherein said vibration extraction filter
comprises an extraction inverse characteristic filter with window that calculates a vibration center value based on said electric power steering state parameter and depending on an inverse characteristic of said predetermined frequency range, and
extracts said vibration component having said predetermined amplitude and said predetermined frequency range based on a difference between said vibration center value and said electric power steering state parameter,
wherein said extraction inverse characteristic filter with window comprises an inverse characteristic filter that has said inverse characteristic of said predetermined frequency range and an amplitude window judging section that comprises a means of increasing or decreasing said predetermined amplitude that is preset depending on an electric power steering state parameter relating to motor current amount,
wherein said extraction inverse characteristic filter with window inputs said electric power steering state parameter to said inverse characteristic filter and then outputs an output of said inverse characteristic filter to said amplitude window judging section,
wherein said amplitude window judging section
performs an amplitude window judging process that judges whether said electric power steering state parameter is within an amplitude window being said previous value of said vibration center value±said predetermined amplitude or not based on said electric power steering state parameter, said output of said inverse characteristic filter and a previous value of said vibration center value after setting said predetermined amplitude by increasing or decreasing said predetermined amplitude depending on said electric power steering state parameter relating to motor current amount,
in a case of judging that said electric power steering state parameter is within said amplitude window, outputs said output of said inverse characteristic filter as said vibration center value, and
in a case of judging that said electric power steering state parameter is outside said amplitude window, outputs a value obtained by adding said predetermined amplitude to said electric power steering state parameter or subtracting said predetermined amplitude from said electric power steering state parameter as said vibration center value.

10. The electric power steering apparatus according to claim 9, wherein said electric power steering state parameter relating to motor current amount is said current command value or said steering torque.

11. The electric power steering apparatus according to claim 9,
wherein said electric power steering state parameter relating to motor current amount is said current command value,
wherein said amplitude window judging section sets said predetermined amplitude so as to increase depending on an increase in said current command value.

12. The electric power steering apparatus according to claim 9,
wherein said compensation value determining section
calculates sensitive gains for changing a proportion of said vibration suppression compensation value depending on an electric power steering state parameter relating to motor current amount and an electric power steering state parameter relating to speed, and
sets a value obtained by multiplying said vibration suppression compensation value determined based on said vibration component extracted by said vibration extraction filter by calculated said sensitive gains as said vibration suppression compensation value.

13. The electric power steering apparatus according to claim 12,
wherein said compensation value determining section
decreases said proportion of said vibration suppression compensation value by decreasing said sensitive gain concerning said electric power steering state parameter relating to motor current amount in a case that said electric power steering state parameter relating to motor current amount is less than or equal to a predetermined threshold, and decreases said proportion of said vibration suppression compensation value by decreasing said sensitive gain concerning said electric power steering state parameter relating to speed in a case that said electric power steering state parameter relating to speed is more than or equal to a predetermined threshold.

14. The electric power steering apparatus according to claim 12, wherein said electric power steering state parameter relating to motor current amount is said current command value or said steering torque, wherein said electric power steering state parameter relating to speed is a steering speed or a motor angular speed.

15. The electric power steering apparatus that provides a steering system of a vehicle with an assist force generated by a motor, comprising:

a current command value determining section that determines a current command value based on a steering torque and a velocity;

a vibration extraction filter that extracts a vibration component having a predetermined amplitude and a predetermined frequency range depending on an electric power steering state parameter; and a compensation value determining section that determines a vibration suppression compensation value based on said vibration component extracted by said vibration extraction filter, wherein vibrations of said motor are suppressed by feeding back said vibration suppression compensation value determined by said compensation value determining section to said current command value determined by said current command value determining section, wherein said vibration extraction filter comprises an extraction inverse characteristic filter with window that calculates a vibration center value based on said electric power steering state parameter and depending on an inverse characteristic of said predetermined frequency range, and extracts said vibration component having said predetermined amplitude and said predetermined frequency range based on a difference between said vibration center value and said electric power steering state parameter, wherein said extraction inverse characteristic filter with window comprises an inverse characteristic filter that has said inverse characteristic of said predetermined frequency range and an amplitude window judging section that comprises a means of increasing or decreasing said predetermined amplitude that is preset depending on said velocity, wherein said extraction inverse characteristic filter with window inputs said electric power steering state parameter to said inverse characteristic filter and then outputs an output of said inverse characteristic filter to said amplitude window judging section, wherein said amplitude window judging section performs an amplitude window judging process that judges whether said electric power steering state parameter is within an amplitude window being said previous value of said vibration center value±said predetermined amplitude or not based on said electric power steering state parameter, said output of said inverse characteristic filter and a previous value of said vibration center value after setting said predetermined amplitude by increasing or decreasing said predetermined amplitude depending on said velocity, in a case of judging that said electric power steering state parameter is within said amplitude window, outputs said output of said inverse characteristic filter as said vibration center value, and in a case of judging that said electric power steering state parameter is outside said amplitude window, outputs a value obtained by adding said predetermined amplitude to said electric power steering state parameter or subtracting said predetermined amplitude from said electric power steering state parameter as said vibration center value.

16. The electric power steering apparatus according to claim 15, wherein said compensation value determining section calculates a velocity sensitive gain for changing a proportion of said vibration suppression compensation value depending on said velocity, and sets a value obtained by multiplying said vibration suppression compensation value determined based on said vibration component extracted by said vibration extraction filter by calculated said velocity sensitive gain as said vibration suppression compensation value.

17. The electric power steering apparatus according to claim 16, wherein in a case that said velocity is more than or equal to a predetermined velocity, said amplitude window judging section sets said predetermined amplitude by decreasing said predetermined amplitude depending on said velocity, and said compensation value determining section decreases said proportion of said vibration suppression compensation value by decreasing said velocity sensitive gain.

* * * * *